(12) United States Patent
Outram

(10) Patent No.: US 12,159,246 B2
(45) Date of Patent: Dec. 3, 2024

(54) METHODS AND SYSTEMS FOR PROVIDING AND RECEIVING INFORMATION FOR RISK MANAGEMENT IN THE FIELD

(71) Applicant: REPIPE PTY LTD, The Vines (AU)

(72) Inventor: Jaqueline Outram, The Vines (AU)

( * ) Notice: Subject to any disclaimer, the term of this patent is extended or adjusted under 35 U.S.C. 154(b) by 0 days.

(21) Appl. No.: 15/557,745

(22) PCT Filed: Mar. 14, 2016

(86) PCT No.: PCT/AU2016/050179
§ 371 (c)(1),
(2) Date: Sep. 12, 2017

(87) PCT Pub. No.: WO2016/141442
PCT Pub. Date: Sep. 15, 2016

(65) Prior Publication Data
US 2018/0068242 A1  Mar. 8, 2018

(30) Foreign Application Priority Data
Mar. 12, 2015 (AU) .............................. 2015900894

(51) Int. Cl.
*G06Q 10/0631* (2023.01)
*G06Q 10/06* (2023.01)
(Continued)

(52) U.S. Cl.
CPC ....... *G06Q 10/06311* (2013.01); *G06Q 10/06* (2013.01); *G06Q 10/0635* (2013.01);
(Continued)

(58) Field of Classification Search
CPC ........... G06Q 10/06; G06Q 10/063114; G06Q 10/06311; G06Q 10/0635; G06Q 50/265;
(Continued)

(56) References Cited

U.S. PATENT DOCUMENTS 7,328,233 B2 * 2/2008 Salim .................. H04L 41/5048
707/999.009
7,933,952 B2   4/2011 Parker
(Continued)

FOREIGN PATENT DOCUMENTS

CA      2476636 A1   1/2006
GB      2517277 A    2/2015
(Continued)

OTHER PUBLICATIONS

Anonymous: "Hierarchical database model—Wikipedia", Feb. 20, 2015, XP055492504, Retrieved from the Internet: URL: https://en.wikipedia.org/w/index.php?title=Hierarchical_database_model&oldid=648001695.
(Continued)

*Primary Examiner* — William S Brockington, III
(74) *Attorney, Agent, or Firm* — Blueshift IP, LLC; Cynthia M. Gilbert

(57) ABSTRACT

Disclosed are methods and systems for providing and receiving information for risk management in the field, and more particularly, methods and systems for accessing permit, plan, risk assessments and equipment information, auto-populating documents, and for transmitting data and receiving notifications based upon permit availability and location. The disclosed systems and methods for risk management provide tools to engage field operators in the process of risk management and encourage field operators to complete the risk management tasks in an appropriate manner.

12 Claims, 28 Drawing Sheets

(51) Int. Cl.
*G06Q 10/0635* (2023.01)
*G01S 19/42* (2010.01)
*G06F 3/04883* (2022.01)
*G06F 9/54* (2006.01)
*G06Q 50/26* (2012.01)
*H04W 4/02* (2018.01)
*H04W 4/029* (2018.01)

(52) U.S. Cl.
CPC .......... *G01S 19/42* (2013.01); *G06F 3/04883* (2013.01); *G06F 9/542* (2013.01); *G06Q 50/265* (2013.01); *H04W 4/02* (2013.01); *H04W 4/029* (2018.02)

(58) Field of Classification Search
CPC ...... G01S 19/42; G06F 3/04883; G06F 9/542; H04W 4/02; H04W 4/029
See application file for complete search history.

(56) References Cited

U.S. PATENT DOCUMENTS

| | | | |
|---|---|---|---|
| 2002/0194014 A1 | 12/2002 | Starnes | |
| 2003/0153991 A1 | 8/2003 | Visser | |
| 2004/0078098 A1 | 4/2004 | Jeffries | |
| 2005/0075968 A1* | 4/2005 | Apostolides | G06Q 10/06 705/38 |
| 2005/0102394 A1* | 5/2005 | Loveland | G06Q 10/06 709/224 |
| 2006/0059490 A1 | 3/2006 | Knapp | |
| 2007/0089053 A1 | 4/2007 | Uhlig | |
| 2008/0134320 A1 | 6/2008 | Desai | |
| 2008/0154691 A1* | 6/2008 | Wellman | G06Q 10/06398 705/7.26 |
| 2011/0109502 A1 | 5/2011 | Sullivan | |
| 2012/0066137 A1 | 3/2012 | Nielsen | |
| 2013/0191300 A1 | 7/2013 | Yoon | |
| 2013/0281157 A1* | 10/2013 | Barbosa | G06Q 10/06 455/556.1 |
| 2013/0332216 A1* | 12/2013 | George | G06Q 10/063114 705/7.15 |
| 2014/0052487 A1* | 2/2014 | Neagu | G06Q 10/06311 705/7.14 |
| 2014/0201064 A1* | 7/2014 | Jackson | G08G 1/0175 705/38 |
| 2014/0249877 A1 | 9/2014 | Hull | |
| 2015/0046977 A1 | 2/2015 | Ward, II | |
| 2015/0106736 A1* | 4/2015 | Torman | G06F 21/629 715/745 |
| 2015/0317571 A1* | 11/2015 | Maetz | G06F 16/9024 386/278 |
| 2016/0110666 A1 | 4/2016 | Rahmouni et al. | |
| 2019/0318284 A1 | 10/2019 | Outram | |

FOREIGN PATENT DOCUMENTS

| | | |
|---|---|---|
| JP | 2002351730 A | 12/2002 |
| JP | 2008171186 A | 7/2008 |
| JP | 2012144113 A | 8/2012 |
| WO | 2016141442 A1 | 9/2016 |
| WO | 2018085898 A1 | 5/2018 |

OTHER PUBLICATIONS

International Preliminary Report on Patentability, dated Jul. 12, 2017, by the Australian Patent Office acting as the International Preliminary Examining Authority in PCT International Patent Application No. PCT/AU2016/050179, 111 pages.

International Preliminary Report on Patentability, dated Mar. 14, 2019, by the Australian Patent Office acting as the International Preliminary Examining Authority in PCT International Patent Application No. PCT/AU2017/051246, 29 pages.

International Search Report and Written Opinion, dated Jan. 5, 2018, by the Australian Patent Office acting as the International Search Authority in PCT International Patent Application No. PCT/AU2017/051246, 16 pages.

International Search Report and Written Opinion, dated Jun. 21, 2016 by the Australian Patent Office acting as the International Search Authority in PCT International Patent Application No. PCT/AU2016/050179, 13 pages.

Non-Final Rejection dated Mar. 17, 2021 for U.S. Appl. No. 16/348,913 of Jaqueline Outram, filed May 10, 2019, 24 pages.

Restriction Requirement dated Jan. 26, 2021 for U.S. Appl. No. 16/348,913 of Jaqueline Outram, filed May 10, 2019, 06 pages.

Canadian Office Action issued in CA3043342, dated Apr. 17, 2024, 7 pages.

Hearing Notice issued in Application No. IN201929023547, dated Jul. 12, 2024, 4 pages.

Final Rejection mailed Jun. 29, 2023 for U.S. Appl. No. 16/348,913 of Jaqueline Outram, filed May 10, 2019, 17 pages.

Non-Final Rejection mailed Jan. 22, 2024 for U.S. Appl. No. 16/348,913 of Jaqueline Outram, filed May 10, 2019, 13 pages.

* cited by examiner

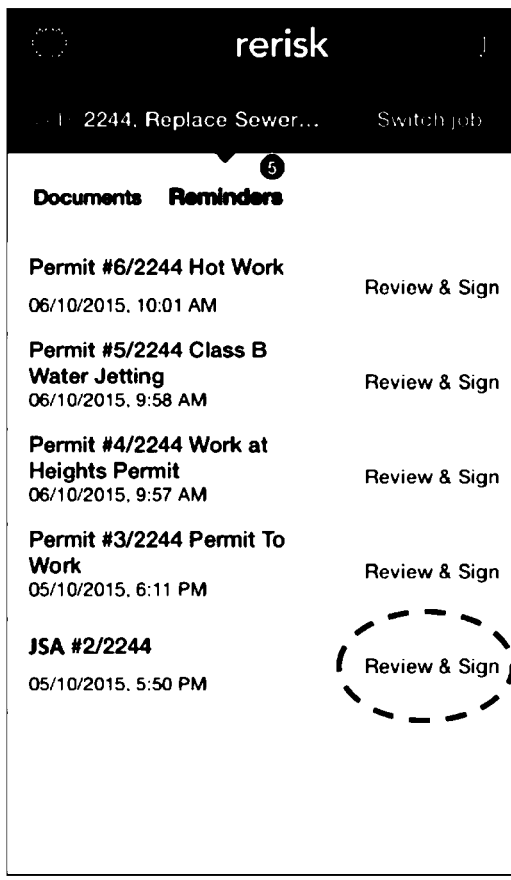
Fig. 42
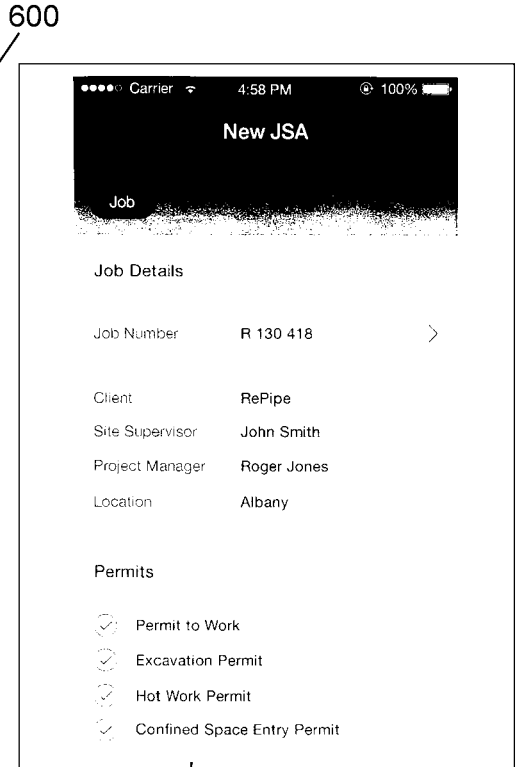
452   Fig. 43
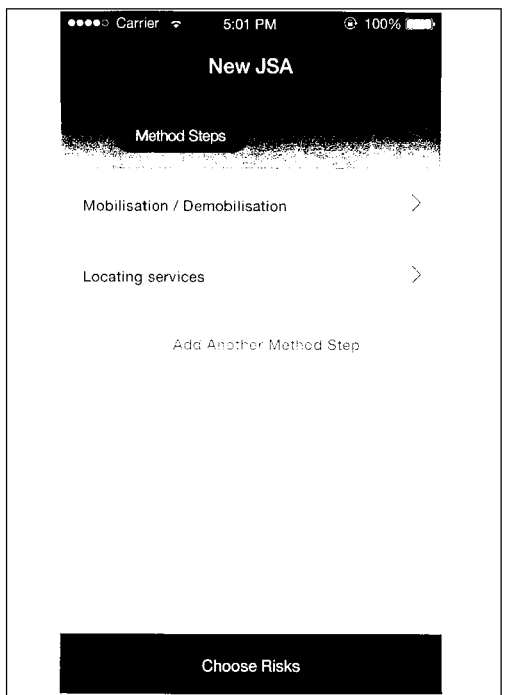
Fig. 44   454
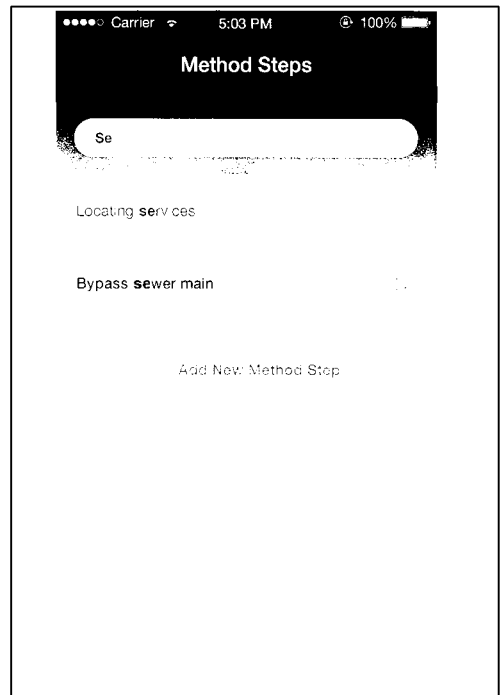
490   Fig. 45

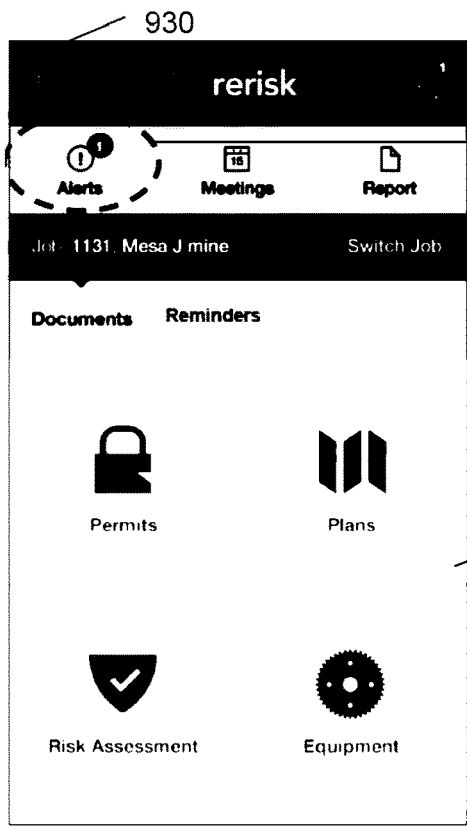
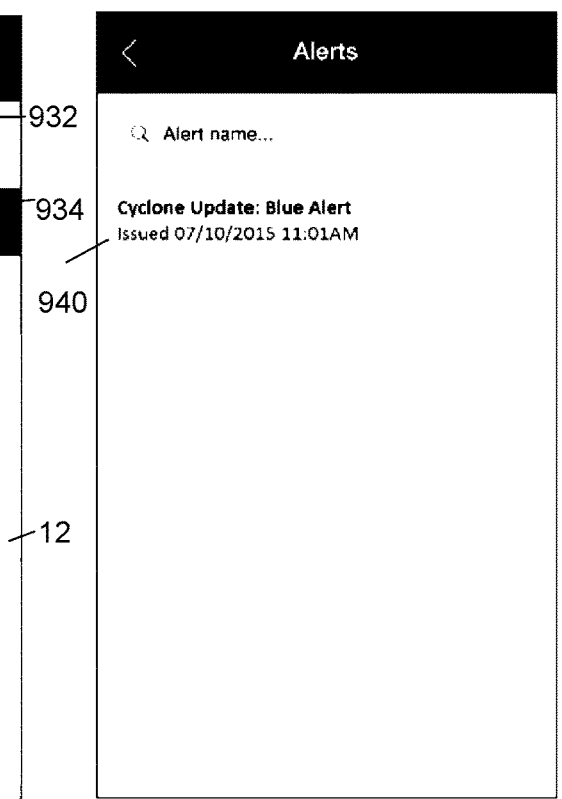
Fig. 53
Fig. 54
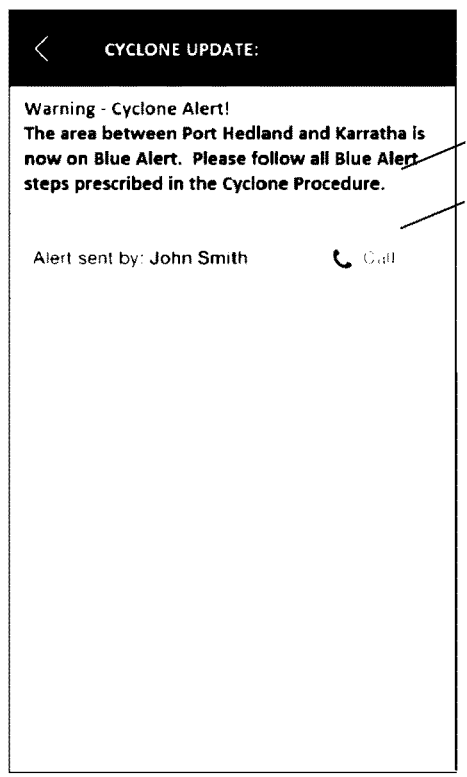
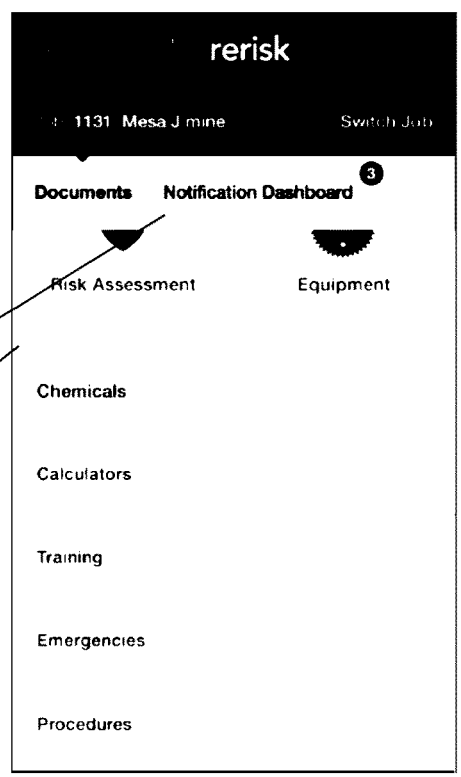
Fig. 55
Fig. 56

METHODS AND SYSTEMS FOR PROVIDING AND RECEIVING INFORMATION FOR RISK MANAGEMENT IN THE FIELD

FIELD OF THE INVENTION

Disclosed are methods and systems for providing and receiving information for risk management in the field, and more particularly, methods and systems for accessing permits, plans, risk assessments and equipment information, auto-populating documents, and for receiving notifications based upon user-specific location, activity and authority and changes in each.

BACKGROUND

Current field risk management practices include a plethora of regulations, codes and standards with regard to employee health & safety, environmental protection and quality management. Every company must comply with all of the requirements—but compliance is particularly difficult when employees are involved in activities that:
  A) are remote from an office or desk ('front line' employees)
  B) occur across multiple sites or sites that change daily (eg. plumbers, electricians, mobile technicians, mobile health care services);
  C) involve building construction, mining, civil construction or any other 'high risk' tasks.

In short, compliance generally requires employees to either:
  1. Complete a checklist of safety checks and implement prescribed controls prior to undertaking a specific task
  2. Undertake a 'risk assessment' before they do any job. In its simplest form, a risk assessment involves:
  A) identifying all of the hazards for each step in the job;
  B) choosing controls for each hazard (the bigger the hazard—the stronger the controls required);
  C) determining (through a 'qualitative' assessment) the 'residual' risk level;
  D) only proceeding with the job if:
  i) the residual risk is appropriate and
  ii) all of the controls have been implemented.

The great majority of these checklists and risk assessments are paper-based—and the volume of paperwork generated is very large. As an example, the following provides a summarised list of the forms front line employees complete on a daily basis:
  A) Equipment Pre-Starts for Vehicles, Trucks, Capital Equipment & Plant: A list of about 30 maintenance checks that must be completed before any employee operates any equipment.
  B) Job Safety Assessment (JSA): A detailed risk assessment of all of the steps in a project or job. The JSA is written for each job and reviewed at least daily. A basic JSA takes up to 60 minutes to develop and up to 20 minutes to review. Every employee involved on the job must review and sign the JSA before they start work each day.
  C) Take 5 Assessment: A check of about 30 hazards before an employee starts a specific task.
  D) Permits: A detailed list of safety checks and prescribed controls that must be in place before specific activities are undertaken. For example, permits are generally required before employees can:
  i) Attend any site to do any work;
  ii) Penetrate any surface (eg walls);
  iii) Excavate (manually or mechanically);
  iv) Enter a confined space;
  v) Work at heights (defined as a risk of fall from a level to another level—which can be less than a foot);
  vi) Undertake electrical works
  vii) Undertake hot works;
  viii) Clear any flora;
  ix) Undertake high pressure water jetting; or use a concrete cutting saw.

Of course, front line employees have a natural aversion to paperwork, especially when they have done the same task or job hundreds of times. The key faults of the paperwork are:
It's a lot like telling field employees to 'write lines' every day.
Field employees don't respect the paperwork—so they arbitrage it.
It's extremely inefficient. For example:
  i) The data from completed paperwork must be manually input by administrative staff into central systems (eg. asset management systems, training systems, records of hours on-site, amount of fuel consumed etc.).
  ii) Because front line employees can arbitrage paperwork, safety investigators must attend site to check the paperwork.

Any references to documents that are made in this specification are not intended to be an admission that the information contained in those documents form part of the common general knowledge known to a person skilled in the field of the invention, unless explicitly stated as such.

Throughout the specification and claims, unless the context requires otherwise, the word "comprise" or variations such as "comprises" or "comprising", will be understood to imply the inclusion of a stated integer or group of integers but not the exclusion of any other integer or group of integers.

SUMMARY OF THE INVENTION

Disclosed are methods and systems for providing and receiving information for risk management in the field, and more particularly, methods and systems for accessing permits, plans, risk assessments and equipment information, auto-populating documents, and for transmitting data and receiving notifications based upon user-specific location, activity, authority and changes in each. The disclosed systems and methods for risk management provide tools to support and engage front line employees in the process of risk management and encourage them to complete the risk management tasks in an appropriate manner.

One embodiment of the disclosed systems and methods provides:
1. The ability for front line employees to complete their risk management documents via a portable computing device, such as an iPhone/iPad/Android. This includes: Pre-Start Checklists, Job Safety Assessments (JSAs), Take 5's, Permits etc.
2. Access and review of:
  a) Personnel qualifications;
  b) Material Safety Data Sheets (commonly "MSDS");
  c) Logbooks;
  d) Equipment Risk Assessments;
  e) Job Method Statements/Notes/Photos etc.;
  f) Company Procedures; and
  g) Company Risk Alerts.
3. The tools engage front line employees by:
  a) Prompting them to consider lists of Method Steps, Tasks, Risks and Controls populated and managed by oversight employees. They also have the capacity to add any 'other' item to each of the Lists with such additions being automatically reported to oversight employees.
  b) Enabling them to search and select any relevant and appropriate Method Steps, Tasks, Risks and Controls;
  c) Assessing the residual risk;
  d) Providing a 'score' for each upload; and:
    i) Keeping a record of employee scores that may be linked to performance reviews and compensation;
    ii) Creating a company-wide leader board.
  e) Offering monthly competitions (eg. Spot the Hazard) and on-line forums for risk improvement ideas (with financial benefits).
4. Improvements in the timeliness and accuracy of risk information by:
  a) GPS tracking the time and location of each access/upload
  b) Preventing front line employees from commencing a task before controls are in place (eg. the time stamp of the Pre-Start must be before the time stamp of equipment movement or time logged on the equipment)
  c) Cross-referencing GPS and time stamp data with incident investigations, compliance audits, customer invoicing etc.
5. The ability to create a database of real-time health & safety data including changes in safety thinking across various factors.
6. Enables oversight employees to complete statistical and other analytics on the data to identify patterns and 'lead indicators' of risk incidents.

According to a first aspect of the present invention there is disclosed a method of providing information for risk management on a mobile computer device including a processor, a memory, a network interface, and a touch display screen, the method comprising:
  receiving at a work site, in the processor via the network interface, first information identifying permits, second information identifying plans, third information identifying risk assessments and fourth information identifying equipment;
  displaying on the touch display screen the first information identifying permits, second information identifying plans, third information identifying risk assessments and fourth information identifying equipment;
  providing access to data relating to permits, plans, risk assessment and equipment respectively with a touch on the touch display screen proximal to displayed first information identifying permits, second information identifying plans, third information identifying risk assessment and fourth information identifying equipment;
  upon receiving a touch input proximal the displayed third information identifying risk assessment, displaying one or more fifth information identifying job safety assessments identifiers; and
  upon receiving a touch signal on the touch display screen proximal to the displayed one or more fifth information identifying job safety assessment identifiers, providing access to data relating to permits, plans and equipment associated with respect to a particular job safety assessment identifier.

Also disclosed are methods and systems for providing information for risk management executed on a mobile computer device including a processor, a memory, a network interface, and a touch display screen, the method comprising:
  displaying an icon indicative of information identifying a process period;
  upon receiving a touch signal on the touch display screen proximal to the displayed icon, receiving and displaying on the touch display screen one or more information identifying log queries;
  upon receiving a touch signal proximal one or more displayed information identifying log queries, transmitting to a remote server one or more data relating to the received touch signal;
  the remote server providing processing to auto-populate the one or more data relating to the received touch signal proximal to one or more displayed information identifying log queries into a document having a log form; and storing the document having a log form.

Also disclosed are methods and systems for risk management executed on a mobile computer device including a processor, a memory, a network interface, and a touch display screen, including:
  receiving, in the processor via the network interface information identifying permits;
  displaying on the touch display screen the information identifying permits; receiving a touch signal proximal the displayed information identifying permits; upon receiving a touch signal on the touch display screen proximal to the information identifying permits, receiving and displaying on the display screen one or more information identifying specific permits, wherein the information identifying specific permits includes indicia indicating whether the permit is in force or whether the permit has expired.

The disclosed methods and systems can also include GPS tracking and can include:
  at a remote location, tracking the location of the computer via the GPS;
  at the remote location, processing whether permits relating to jobs at the location of the computer have expired;
  if the permits relating to the location of the computer have expired, transmitting a notification of the same for delivery to the computer.

According to another aspect of the invention there is disclosed a method comprising: selecting a job to be performed by a person in possession of the portable device; downloading information related to the job to the portable device, the information comprising permits required for the job, plans for implementation of the job, risks associated with the job, equipment used in relation to the job;
displaying a corresponding indicia for selection of each one of: the information relating to permits required for the job, the information relating to plans for implementation of the job, the information relating to risks associated with the job, the information relating to equipment used in relation to the job;
receiving a selection of one of the indicia;
displaying at least a portion of the downloaded information according to the received selection;
receiving input to the portable device relevant to use of the displayed information in relation to performance of the job by the person;
uploading the input, whereby a record of use of the displayed information in relation to performance of the job by the person is able to be stored.

According to another aspect of the invention there is disclosed a portable device comprising a processor configured to perform:
  selection of a job to be performed by a person in possession of the portable device; downloading information related to the job, to the portable device, the information comprising permits required for the job, plans for implementation of the job, risks associated with the job, equipment used in relation to the job;

displaying a corresponding indicia for selection of each one of: the information relating to permits required for the job, the information relating to plans for implementation of the job, the information relating to risks associated with the job, the information relating to equipment used in relation to the job;

receiving a selection of one of the indicia;

displaying at least a portion of the downloaded information according to the received selection;

receiving input to the portable device relevant to use of the displayed information in relation to performance of the job by the person;

uploading the input, whereby a record of use of the displayed information in relation to performance of the job by the person is able to be stored.

In an embodiment the selection of the job comprises selection of a job type. The job type preselects the information to be downloaded according to the job type from a library of information available.

In an embodiment the information comprises information from a form that is to be completed when a job of the job type is to be performed and the input is information to be completed on the form when the job of the job type is about to be performed or has been completed.

In an embodiment the information comprises one or more checks that are able to be performed by the portable device so as to indicate to the user whether or not they are permitted to perform the job according to the input received in respect of the information displayed. In this manner the person is not permitted to perform the job until, for example, all of the safety checks have been performed for that particular job and they have checked off the safety checks by input into the device. Additionally upload of the input allows for compliance monitoring.

According to another aspect of the invention there is disclosed a system comprising a processor configured to:

select a job to be performed by a person in possession of a portable device; download information related to the job to the portable device, the information comprising permits required for the job, plans for implementation of the job, risks associated with the job, equipment used in relation to the job;

displaying a corresponding indicia for selection of each one of: the information relating to permits required for the job, the information relating to plans for implementation of the job, the information relating to risks associated with the job, the information relating to equipment used in relation to the job;

receive a selection of one of the indicia;

display at least a portion of the downloaded information according to the received selection;

receive input to the portable device relevant to use of the displayed information in relation to performance of the job by the person;

upload the input, whereby a record of use of the displayed information in relation to performance of the job by the person is able to be stored.

In an embodiment the processor is further configured to:
provide one or more actions to the user for selection;
receive a selection of one of the actions;
transmit the selection; wherein the transmission of the selection initiates the selected action and blocks selection of one or more actions related to the selected action by other users until the selected action is completed.

In an embodiment the processor is further configured to:
provide one or more actions to the user which ordinarily are available for selection;
receive a block communication from a remote system when a related action is initiated;
block selection of at least one of the actions until the related action is completed;
receive an unblock communication indicating that the related action is completed and then allowing selection of one of the actions.

In an embodiment the system comprises a database hierarchically structured by job, and within each job there are fields related to an organisational structure for performance of the job and a tasked structure for performance of the job. In an embodiment the organisational structure comprises one or more of: information on procedures, risk limits, personnel, chemicals, equipment and lists. In an embodiment the lists comprises one or more of: method steps, tasks, risks and controls. In an embodiment the job structure comprises one or more of: job details, client details, job roles, plans/specifications and risk alerts.

In an embodiment the database further comprises communications records. In an embodiment the communications further comprises one or more of: meetings, reports, completed forms and alerts. In an embodiment the completed forms comprises one or more of: permits, plans, equipment and risk assessments.

In an embodiment the database further comprises permissions for actors to create, edit and access the database. In an embodiment permissions are set according to whether the actor is an oversight employee, a project manager, a site supervisor or field personnel. In an embodiment some permissions are set according to whether the actor is a permit issuer, permit holder, field operator working in relation to the permit or an oversight employee, a project manager, a site supervisor.

In an embodiment the field personnel access the present invention via a mobile application. In an embodiment the site supervisors access the present invention via a mobile application. In an embodiment the project managers access the present invention via a mobile application and/or a personal computer. In an embodiment the oversight personnel access the present invention via a mobile application and/or a personal computer.

In an embodiment project managers have permission to define and allocate plans to achieve the job requirements. In an embodiment all actors are able to view the plan.

In an embodiment specific actors (with appropriate qualifications) have permission to create permits and authorise field personnel to perform work under a permit. In an embodiment the specific actors have permission to allocate a holder of the permit who is qualified to hold a permit and will be responsible for meeting the conditions of the permit. In an embodiment a project manager and a site supervisor have permission to view a permit issued in relation to the job they have responsibility for. In an embodiment the specific actors can share a permit with another qualified permit issuer. In an embodiment the permit holder has permission to view and accept a permit allocated to them. In an embodiment field personnel have permission to view and accept work under the permit. In an embodiment the permit holder has permission to transfer a permit to another qualified permit holder if the transference is accepted. In an embodiment the permit holder has permission to add other personnel to perform work under the permit.

In an embodiment project managers, have permission to create Job Safety Assessments (JSAs). In an embodiment field personnel have permission to accept or suggest a change to a JSA.

In an embodiment all actors have permission to complete a pre-start checklist. In an embodiment the checklist is prescribed. In an embodiment site supervisors and project managers can view all completed pre-start checklists.

In an embodiment where a pre-start checklist is not successfully completed, the system is configured to create an alert in relation to the failed checklist.

In an embodiment field personnel have permission to create a quick risk assessment. In an embodiment site supervisors and project managers can view all completed quick risk assessments.

In an embodiment where a quick risk assessment is not successfully completed, the system is configured to create an alert in relation to the failed quick risk assessment.

In an embodiment oversight personnel have permission to create a register. In an embodiment other actors have permission to view the register.

In an embodiment oversight personnel and project managers have permission to create an alert for all actors on a job.

In an embodiment field personnel have permission to create a hazard report or an incident report. In an embodiment users have permission to access the report.

In an embodiment the system is configured to display four major icons on a mobile device for selection on a home screen, where the icons each represent permits, plans, equipment or risk assessments, respectively. In an embodiment viewing of information and entry of information related to one of these is hierarchally displayed or received. In an embodiment menu options under these headings are presented, with a sequential progression from one screen to the next to complete one or more forms relating to these types of information.

In an embodiment the system is configured to provide a communications icon on the home screen which enables access to communications tools. In an embodiment the communications icon also represents when a communication is requiring the attention of the actor.

In an embodiment the mobile device is configured to synchronise data with the system database when network communication is re-established after network communication is broken.

In an embodiment the mobile device is configured with searchable and expandable lists of information.

In an embodiment the system is configured to log data entered and then match completion of forms with commencement of and completion of tasks to ensure compliance with safety protocols. In an embodiment the logs comprise time stamps. In an embodiment the logs comprise location recording. In an embodiment the logs may comprise other input, such as barcode scan or bear field device scan.

In an embodiment the system is configured to test a validity period of one or more of a permit or plan or other requirement, and to create an alert if the current time is not within the validity period.

In an embodiment the system is configured to test the applicability of a valid locality of one or more of a permit or plan or other requirement, and to create an alert if the current location is not within the valid location when an action is commenced requiring the respective permit, plan or other requirement.

In an embodiment the system is configured to check the requirements for issuance of a permit against records of the actor who intends to issue the permit and records of the actors to which the permit is intended to be issued, and in the event that the requirements are not met raises an alert that the requirements are not met. In an embodiment the system is configured such that if permit requirements are not met then the permit is unable to be issued.

In an embodiment the system is configured to create a JSA by receiving a selection of method steps in the activity for which the JSA is being created, receiving a selection of risks applicable to the selected method steps, receiving a selection of controls to mitigate the selected risks; receiving a selection of a risk rating for each of the selected risks; receiving a selection of one or more personnel to which the JSA is applicable.

In an embodiment the method steps may be selected from a predefined list of method steps. In an embodiment the risks may be selected from a predefined list of risks. In an embodiment the controls may be selected from a predefined list of controls. In an embodiment the risk ratings may be selected from a predefined risk rating matrix. In an embodiment the personnel may be selected from a predefined list of personnel assigned to the job for which the JSA is being created.

In an embodiment each of the selected personnel are sent a message to request acceptance of the JSA.

In an embodiment the system is configured to create a risk assessment by receiving a selection of a task to be performed; receiving a selection of possible risks that may be applicable to the selected tasks; receiving a selection of controls to mitigate the selected possible risks.

In an embodiment the task may be selected from a predefined list of tasks. In an embodiment the possible risks may be selected from a predefined list of possible risks. In an embodiment the controls may be selected from a predefined list of controls.

In an embodiment the system is configured to display information about checks to be performed before use of an item of equipment (pre-start); providing a check box for each part of the item of equipment to be checked; receiving a selection when the part is checked; and displaying a message that the item is unable to be used until the checklist is successfully completed. In an embodiment if an item in the check list is selected as a failure of the pre-start check, the system is configured to create an alert. In an embodiment the item of equipment may be flagged in the database as out of service until it is repaired or replaced.

In an embodiment the pre-start comprises identifying the item of equipment, for instance by a bar code scan, entry of a serial number or by other means.

In an embodiment the system is configured to display information relating to the item of equipment or part to be inspected, or how to inspect the part.

In an embodiment assignment to a job can trigger creation of a geofence by retrieval of information from the database about which actor is carrying the mobile device either should not exit or should not enter; and the mobile device checks the location against the geofence and creates an alert when the geofence is crossed.

According to another aspect of the invention there is disclosed a system comprising: a communication channel to a portable device;
a processor configured to receive a selection of a job to be performed by a person in possession of the portable device; wherein the processor is configured to retrieve and send to the portable device information related to the selected job, the information comprising permits required for the job, plans for implementation of the job, risks associated with the job, equipment used in relation to the job; the information being suitable for display by the portable device;
wherein the communication channel is configured to receive from the portable device an input received by the portable device relevant to use of the displayed information in relation to performance of the job by the person;
a storage for storing a record of use of the displayed information in relation to performance of the job by the person.

According to another aspect of the invention there is disclosed a method of providing a document to a user of a mobile computing device, comprising:
identifying a user of the mobile device;
receiving one or more jobs that the user is allocated to from a data repository; selecting a job from the received jobs;
receiving a role of the identified user in respect of the selected job from the data repository; selecting a document type;
retrieving a template of the selected document type from the data repository according to the selected job and the selected document type;
displaying the template document to the user;
providing one or more actions to the user for selection;
receiving a selection of one of the actions;
transmitting the selection; wherein the transmission of the selection initiates the selected action.

DESCRIPTION OF THE DRAWINGS

In order to provide a better understanding, embodiments of the present invention will be described, by way of example only, with reference to the accompanying drawings, in which:

FIGS. 2-13 are flowcharts that depict embodiments of the disclosed systems and methods;

FIGS. 15-56 depict screen shots of main pages as shown for example in FIG. 1, permit pages, assessment pages and equipment pages;

DETAILED DESCRIPTION

Figure 1:
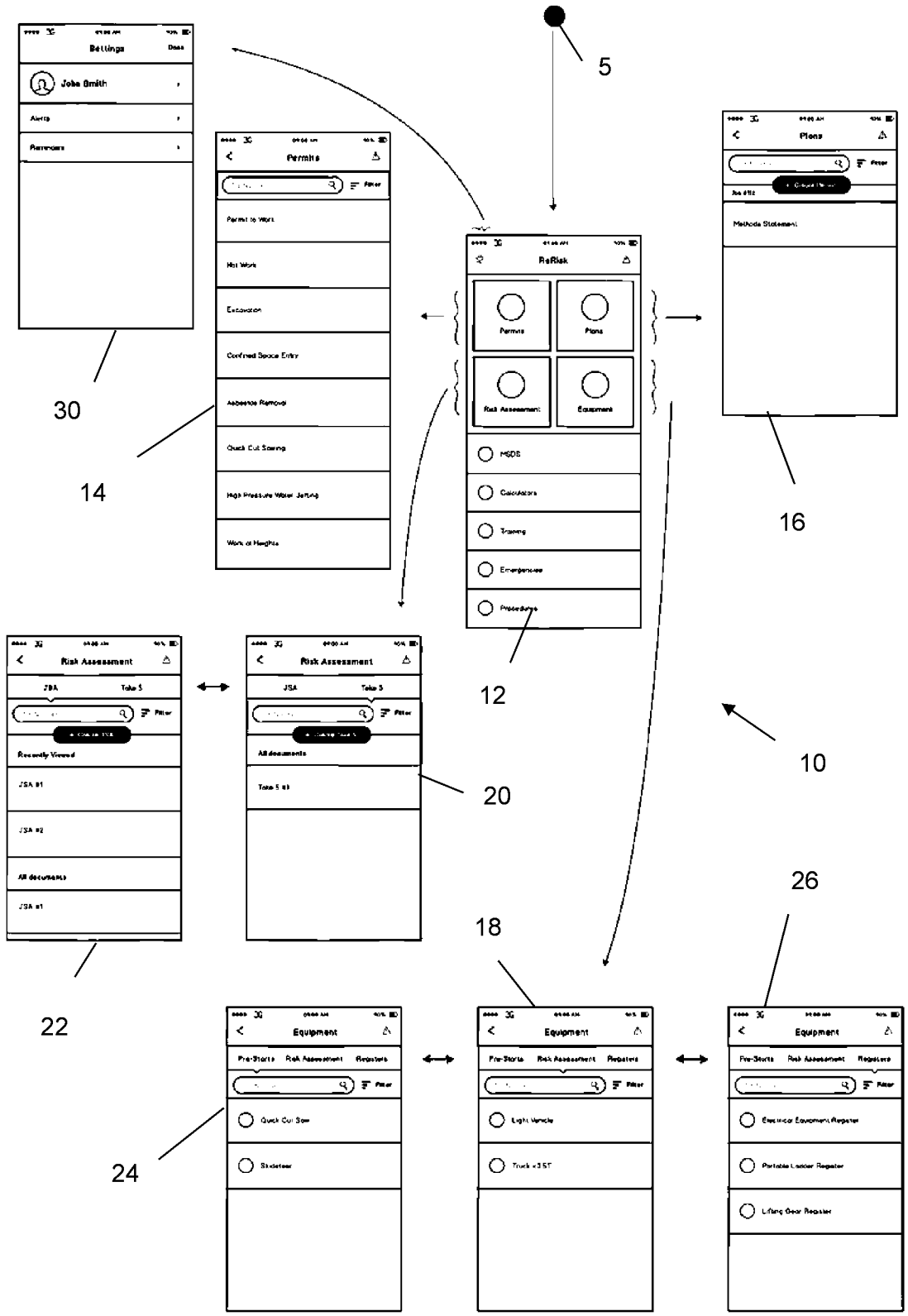
FIG. 1 is a flowchart that depicts an embodiment of the home screen and illustrates where the four different functions lead to in the systems and methods.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimisation of any risk of obscuring the principles and concepts according to the present invention, discussion of such software and ICs, if any, is limited to the essentials with respect to the principles and concepts within the preferred embodiments.

Disclosed are methods and systems for providing and receiving information for risk management in the field, and more particularly, methods and systems for accessing permit, plan, risk assessments and equipment information, auto-populating documents, and for transmitting data and receiving notifications based upon permit availability and location. As discussed above, the disclosed systems and methods enable field-based personnel to manage the risks associated with their works. Compliance monitoring is improved (for example, by GPS and time tracking activities).

Other tools for field operators are provided by overall structure and navigation methods that provide:
  a) Effective selection and implementation of risk controls; and
  b) The timely and efficient completion of risk documentation, for example, by auto-populating logs.

The following disclosed structures and navigation systems and methods include processes for navigation, auto-populating, alerts for permit and plans status, equipment pre-start visual prompts, database tapping, real time auto alerts, equipment heavy usage checks, equipment tagging auto reminders and paint colour substitution.

Each document that requires an action (eg; agreement or signing) will have an action button that allows the user to perform the action. The action to be performed is adapted according to the status of the document, and the role the user has in relation to the document and the job. When actioned, a copy of the document before actioning is saved and a new document created. A document can be locked while another requirement is pending. For example if a permit is in the process of being transferred from one holder to another, a field personnel will not be able to accept the permit or close the permit.

Definitions of terms used are provided with embedded references. For example, a risk can be selected and the definition and other information related will be explained.

In an embodiment the tools of the present invention are provided via an application operating on a mobile computing device, such as a smart phone. It is known that a smart phone is a mobile computing device which has a processor, memory, a display screen which is also an input device in the form of a touch screen and a network communication device(s). Typically the smart phone is loaded with a computer program stored in the memory, which when executed by the processor forms the application. Put another way the computer program comprises instructions for controlling the processor to configure the mobile device as a system according to an aspect of the invention. When the computer programs instructions are executed, the mobile device performs a method according to another aspect of the invention.

It will be appreciated that the invention can be implemented in a number of ways. One way of implementing the invention is according to the embodiments described below.

In an embodiment an aspect of the tools are provided on a more general computing device, such as, but not limited to a laptop or desktop personal computer. The term personal computer is not intended to be limiting as it could be implemented on a portable computing device, although when used in an office environment, size, weight and portability more generally are less constraining. Some of the aspects of the present invention need not be implemented in the field, as will be explained in more detail below. Such implementation can be provided by software installed on the personal computer, or they can be implemented by software at a remote location which is assessable from the personal computer, such as via a browser installed on the personal computer. Such implementation is commonly referred to as a software as a service model or software in the "cloud".

Figure 57:
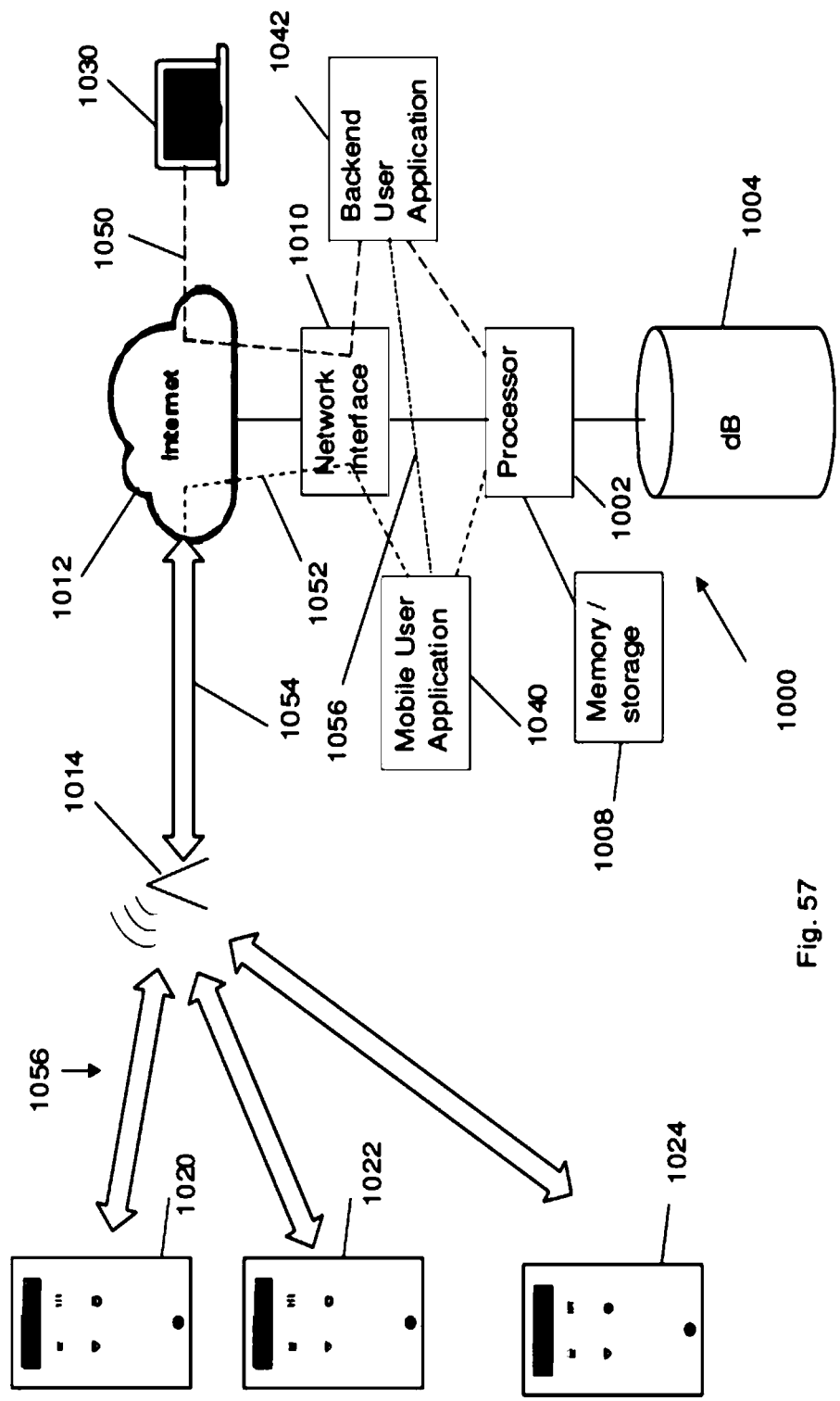
FIG. 57 is a schematic block diagram of a system according to an embodiment of the present invention.

Referring to FIG. 57 there is shown a system 1000 according to an embodiment of the present invention, the system 1000 comprising a processor 1002, a database 1004, memory/storage 1008, a network interface 1010 connected to a computer network 1012 (such as the Internet). The network 1012 comprises a mobile telephone network 1014, (or other wireless network) which connects to a plurality of portable computing devices 1020, 1022 and 1024. The network 1012 also connects to a personal computer 1030.

Executing on the processor 1002 are a mobile user application interface 1040 and a backend user application 1042. The mobile user application interface 1040 interfaces with the portable devices 1020, 1022 and 1024 by communication channel 1052 via the network interface 1010, the network 1012 and 1014. The communication channel includes a communication 1054 into the mobile telephone network 1014 and wirelessly by communication 1056 between a base station and the mobile devices 1020, 1022 and 1024. The backend user application 1042 has a communication channel 1050 to the personal computer 1030 via the network 1012.

The personal computer 1030 gives offsite personnel access to the present invention. Whereas the mobile user application interface 1040 gives onsite users of the personal devices 1020, 1022 and 1024 access to the present invention. The mobile user application 1040 is able to interact with and exchange information with the backend user application 1042 by communication channel 1056.

Figure 58:
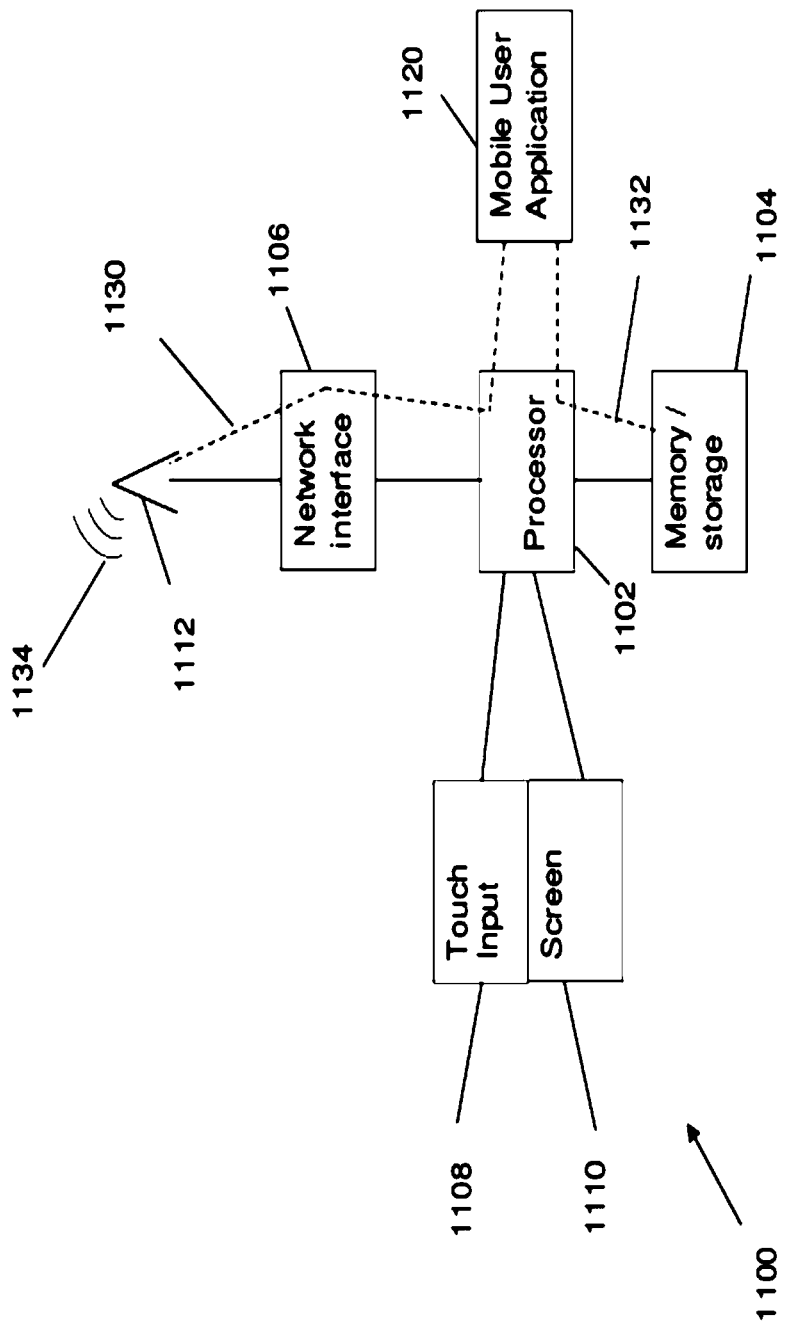
FIG. 58 is a schematic block diagram of a portable device according to an embodiment of the present invention.

Referring to FIG. 58, each personal computing device 1020, 1022 and 1024 comprises components 1100. These components 1100 comprise a processor 1102, memory/storage 1104, network interface 1106, a screen 1110 and touch input 1108 which is typically a touchscreen combining elements 1108 and 1110.

Executing on the processor 1102 is a mobile user application 1120 which communicates by network interface 1106 and antenna 1112 with the mobile telephone network by wireless communication 1134. As an alternative to the mobile telephone network, a Wi-Fi network or other wireless network may be used instead. The mobile user application interface 1040 is able to communicate with the mobile user application 1120 by a communication channel 1130. The mobile user application 1120 is able to store data via communication channel 1132.

Figure 59:
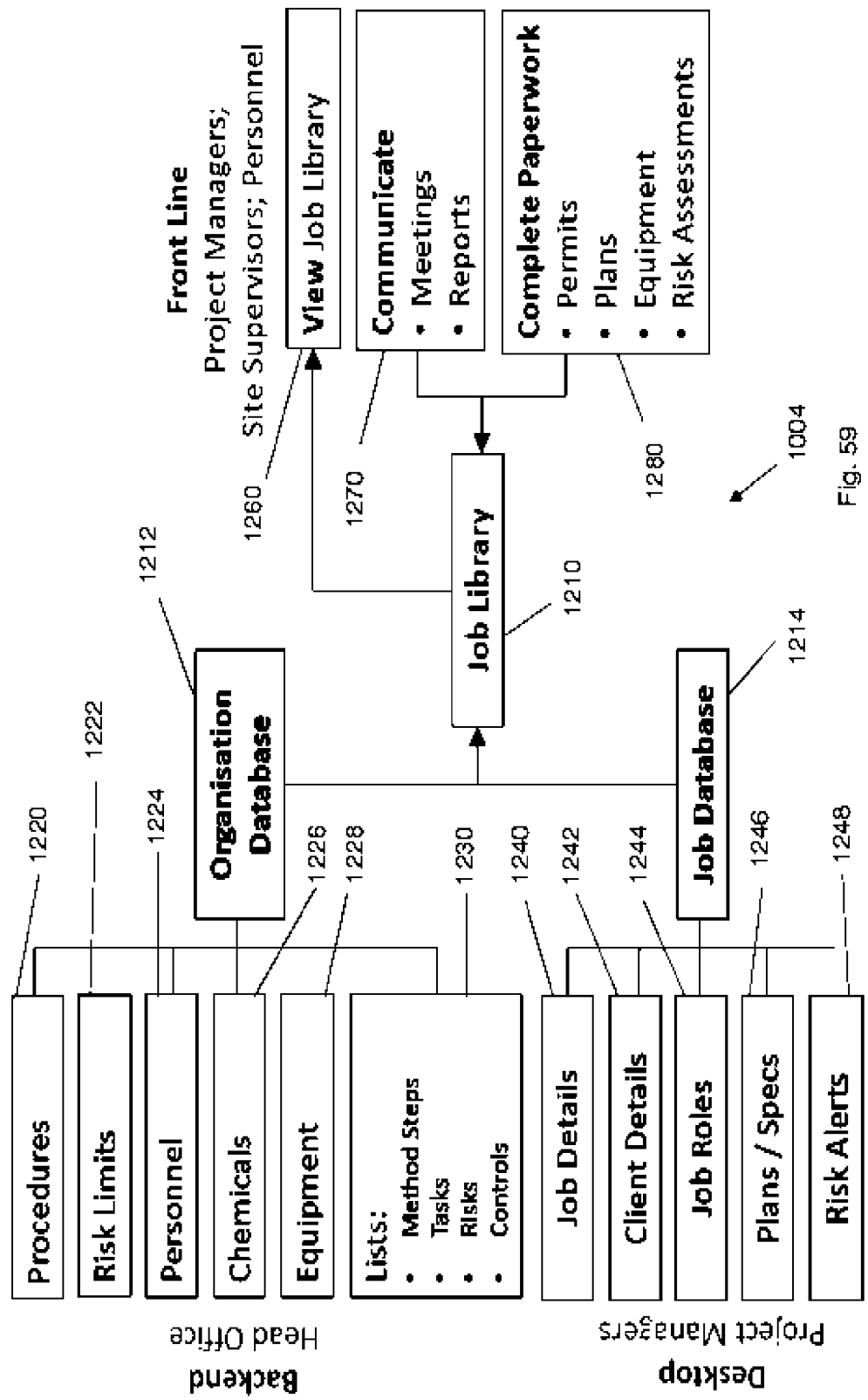
FIG. 59 is a relational diagram of a database according to an embodiment of the present invention.

In an embodiment the database 1004 is structured as shown in FIG. 59 and is in the form of the job library 1210. The job library 1210 comprises an organisation database 1212 and a job database 1214. The organisation database 1212 comprises information on procedures 1220, risk limits 1222, personnel 1224, chemicals 1226, and equipment 1228. It also includes lists 1230 such as for example method steps, tasks, risks and controls. The job database 1214 comprises job details 1240, client details 1242, job roles 1244, plans/specifications 1246 and risk alerts 1248. The job library 1210 also includes stored communications 1270 which include meetings and reports, and completed paperwork 1280 including permits, plans, equipment and risk assessments. The job library 1210 is able to be viewed by making a query 1260 to view the job library by actors, including project managers, site supervisors and in the field operators.

Figure 14:
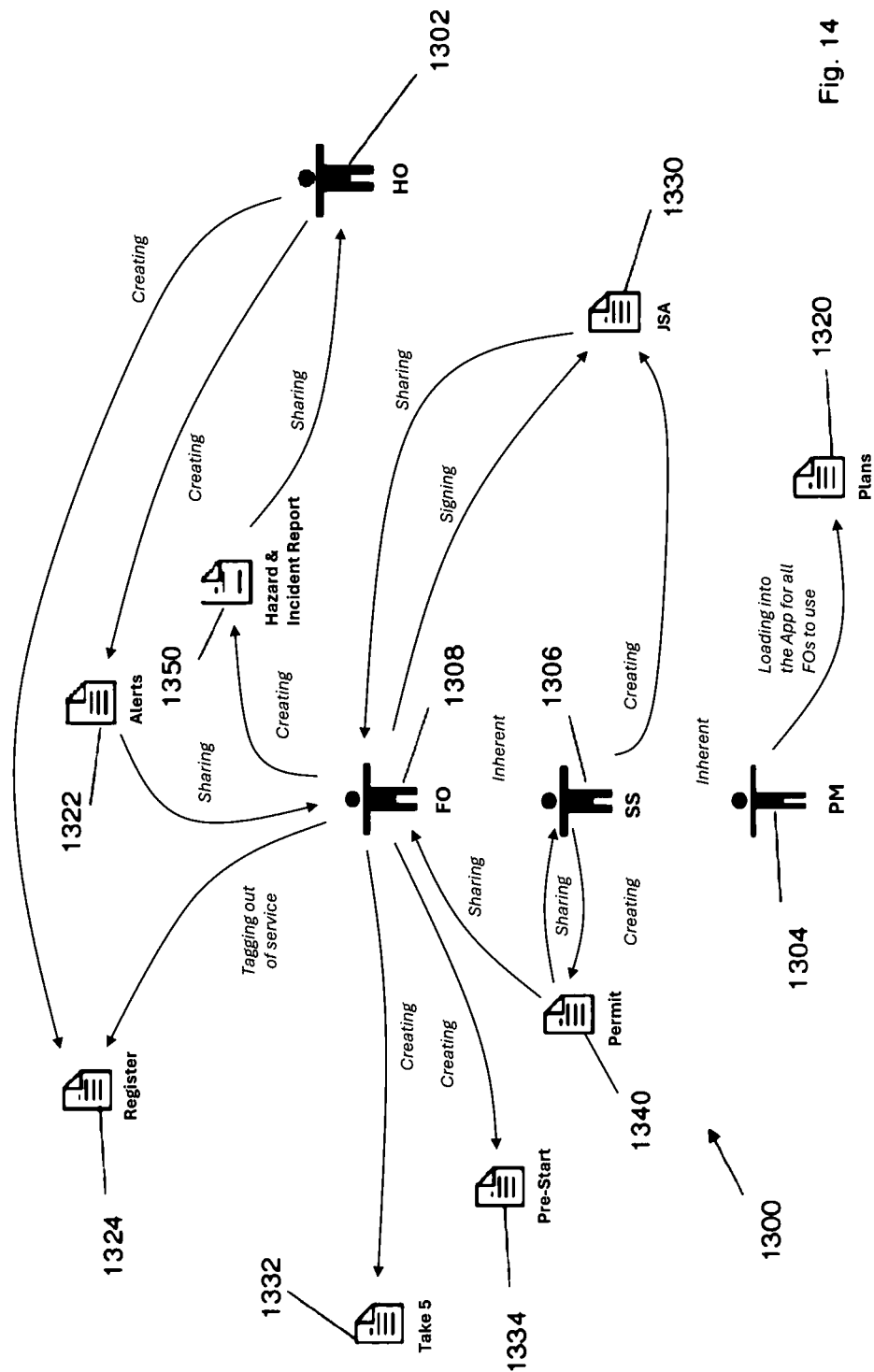
FIG. 14 depicts an embodiment of the document flow between actors.

Referring to FIG. 14, the present invention facilitates indication of risk assessments by actors using the present invention, these actors include oversight personnel 1302, project managers 1304, site supervisors 1306 and field operators 1308. The oversight personnel are usually located in a company head office. FIG. 14 shows a schema 1300 by which these actors can communicate information and provide risk assessments. The schema 1300 is provided in the context of a job which these actors have been assigned to. For this job there will be allocated: one or more oversight personnel 1302, one or more project managers 1304, one or more site supervisors 1306 and one or more field operators 1308.

The project managers 1304 may use any of a personal computer 1030 or one of the portable devices 1020, 1022, or 1024 to define and allocate plans 1320 to achieve the job requirements. For a known type of job the plans may be relatively consistent between each of those types of job, although they may be tailored according to the specific job requirements. Also a plan maybe individually crafted according to the job requirements. When specified, plans are loaded into the database 1004 for that particular job and are able to be accessed by all of the actors assigned to that job.

Oversight personnel 1302 may specify which site supervisors are authorised to issue which permits. Site supervisors that are authorised, can create permits 1340. Some permits will require acceptance by a project manager or by a specific permit issuer. Where a change occurs to permit 1340, the project manager 1304 should be advised. Permits can be shared between site supervisors 1306. Some permits 1340 have to be updated (closed) at the end of the job, such as a permit to work. Some permits 1340 have to be updated when conditions change. Permits 1340 can be shared with project managers 1304, site supervisors 1306 and field operators 1308, and subsequently the project managers 1304, site supervisors 1306 and field operators 1308 need to accept the permit. Generally, permits may be Long Term Permits or Short Term Permits, which are described further below.

Site supervisors 1306 can also create Job Safety Assessments (JSAs) 1330. Typically the JSA 1330 has to be accepted by everyone working on the job site and in particular field operators 1308. A JSA 1330 can be updated, including by adding risks observed on the jobsite. When a JSA 1330 is updated all of the personnel who accepted it should be automatically informed of the update. The project manager 1304 is also alerted to any changes to the JSA 1330.

The project manager 1304 can perform all the operations that a site supervisor 1306 can perform.

Field operators 1308 can create a pre-start checklist 1334. Field operators 1308 can only access their own pre-starts 1334 which allows them to be tailored to the individual. The site supervisor 1306 and project manager 1304 can access all of the pre-starts 1334 for a specified job. For high-risk tasks, when something is not right according to the checklist provided in the pre-start, other personnel on site can be automatically alerted of the problem.

The field operators 1308 can also take their own quick risk assessment, called a Take 5. A "Take 5" generally involves: 1) stopping to look and listen to observe the work area and focus on any potential problems or risks; 2) review the task to be performed; 3) identify the risks; 4) manage the risks; 5) perform the work and assess the work and work area once completed. The field operator 1308 can access their own Take 5, but other field operators 1308 are not able to access other people's Take 5s. The site supervisor 1306 and project manager 1304 can access all Take 5s for a specified job.

A site supervisor 1306 can perform all the functions of field operators 1308.

The oversight personal 1302 can create a register 1324. The register 1324 is uploaded from the personal computer 1030 into the memory 1104 and is accessible by use of the mobile user application 1120. The oversight personnel 1302 and project manager 1304 can be alerted when something is changed in the register 1324.

Head office can create alerts 1322, which is when they need to notify on site personnel 1308 of an important piece of information. The alert 1322 will be pushed to the app 1120 where it is able to be drawn to the person's attention and inspected to find out the details of the alert 1322. A field operator 1308 can also create a hazard, or an incident report 1350 where they specify that a hazard has been observed or an incident has occurred, this is then shared from the mobile application 1120 with head office by being pushed from the mobile device 1020, 1022 and 1024 to the mobile user application 1040 then to the backend application 1042 for display on to the personal computer 1030 accessible by oversight personnel 1302.

The system 1000 and method 1300 allows for sending the approval of permits, sending off for reviewing acceptance of risk assessments and permits, sending and transfer of ownership permits, sending to everyone to enable access to registers and plans, sending to the project manager and site supervisor to enable access to Take 5s, JSAs and pre-starts and notification about the document updates to JSAs, registers, permits and allows sending of warnings (alerts).

Referring to FIG. 1, which schematically shows operation of the application 1120 on one of the personal devices 1020, 1022 or 1024. Starting at 5, the field employee (including a project manager, site supervisor or field operator) logs in, so that their identity is known. Additionally they may be allocated to a job. If they are working on multiple jobs at a time, then they are able to select the job that they are working on in this context. Depending on the selection of the jobs, the information accessible in the data base 1004 through the application 1120 will be specifically tailored to the job.

Irrespective of the type of job, the presentation of information is intended to be consistent. A home screen 12 is shown which comprises four major icons representing different types of information. From the home screen 12 a user of the mobile computing device can navigate to a number of tools represented by major icons. The first icon represents information about permits (top left-hand corner). The next icon in the top right hand corner represents information about plans. The next icon in the bottom right hand corner represents information about equipment. The final icon in the bottom left hand corner represents information about risk assessments.

By selection of one of these icons, the user of the application is taken to a screen representing permits 14, plans 16, equipment 18, or risk assessments 20, respectively.

In each of these respective screens 14, 16, 18 or 20 the operator of the mobile device is presented with information specifically related to permits, plans, equipment or risk assessments, respectively. From there, the person may make another selection and is then taken to a further screen, such as for example further equipment screens 24 and 26 or further risk assessment screen 22. The user is also able to access settings on setting screen 30. This provides information about the user and the user can change settings in this menu.

Figure 15:
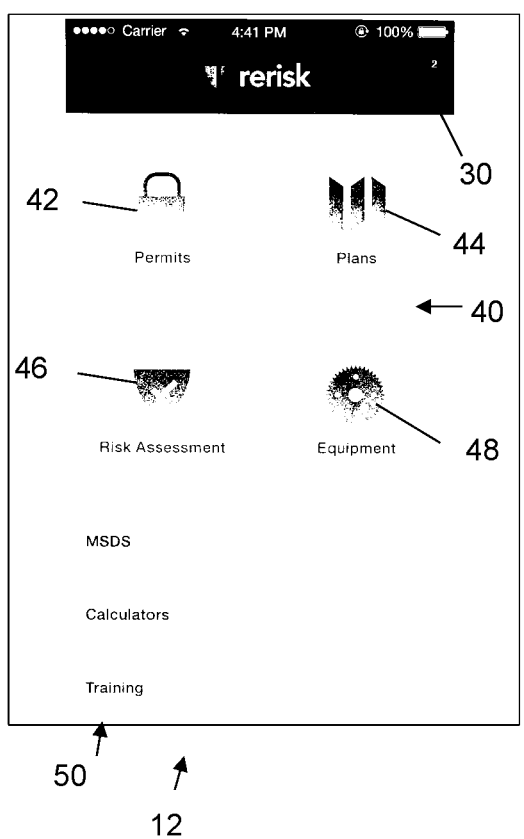

The home screen 12 is shown in more detail in FIG. 15. It comprises a message icon 31 in the top right-hand corner which alerts the field personnel user of the mobile device (such as field operator 1308 or site supervisor 1306) when there are messages that are waiting for viewing, much in the same way as a mobile phone indicates when a text message is waiting for viewing on the messages icon. The icons for permits 42, for plans 44, for risk assessment 46 and equipment 48 are shown. There are also minor icons for other access to other useful information 50 as will be described further below.

Navigation between the menus in the present invention is hierarchical. When a selection is made, the user is taken to the next level of menu down in the hierarchy with the ability to select from information to be entered or viewed. Selection of an item in a menu can be made by touching the respective area in the normal manner that a touchscreen operates. Data can be entered by touching a screen to select a check box/radio button, or by entering of text into a text box by typing, or by using voice to text to enter information into the text box.

Information is presented in a way that prompts the memory of the user by providing a prompt to identify method steps, tasks, risks and controls using searchable and expandable lists. For example there are a number of risks associated with acids. They include: exposure to the acid, inhalation of the acid, spillage of the acid, swallowing of the acid etc. The user is presented with these risks upon keying in "acid" and can access information about these risks. The user can see the list of risks associated with that risk category and can select information about a particular risk in a consistent and hierarchical manner.

Administrators can access backend information to perform tasks such as controlling templates and searched risks lists, adding the personnel including permit issuing authorities, managing the use of procedures, qualifications and material safety and data sheet (MSDS) information as well as issuing global alerts.

Project managers can access the desktop front-end to perform tasks including creating jobs, allocating personnel to jobs, setting job roles within defined authority, attaching job plans and issuing job alerts (that is an alert to people operating on a particular job) or in relation to a particular aspect of the job.

The mobile application running on the portable computing device is also accessible by project managers, site supervisors and field personnel, so that they can perform tasks including issuing in transferring permits if authorised, holding work outstanding by testing and closing permits, creating signing updating transferring closing JSAs, creating Take 5s, pre-start lists for equipment and taking equipment out of service, viewing alerts recording meetings and records of meetings and viewing reports, viewing machines, viewing MSDSs, viewing qualifications, viewing registers and during procedures, using calculators and safety thinking challenges.

Navigation
A) Communication activities (including Risk Alerts; Daily Pre-Start Meetings; Weekly Toolbox Meetings; Hazard & Incident Reports; Non-Compliance Reports & Idea Logs) can be accessed through an icon at the top right hand corner of the mobile device. Importantly, this icon can remain fixed in position so it can be accessed from any screen within the interface.

B) Risk tools as seen in the home screen 12 in FIG. 1 can be selected by selection of a main button of one of the four main icons. The selection is in the normal manner of touching an adjacent portion of the touch screen. In the embodiment of FIG. 1 the screen transitions to a respective screen 14, 16, 18 or 20 representative of the major functions of the present invention:

1. Permits. This icon directs the user to all of the potential Permits that may be required including, but not limited to:
   a. Permits to Work;
   b. Work at Heights;
   c. Confined Space Entry;
   d. Hot Works;
   e. Asbestos Removal;
   f. Excavation;
   g. Penetration;
   h. Quick Cut Sawing;
   i. High Pressure Water Jetting;
   j. Environmental (Flora or Fauna);
   k. Vegetation Clearing;
   l. Cultural Area Access;
   m. Works on Heritage Structures
2. Plans. This icon directs the user to all of the Plans that may be required including, but not limited to:
   a. Construction Schedules;
   b. Method Statements;
   c. Dial Before You Digs (DBYDs);
   d. Contaminated Sites;
   e. Environmental (Flora or Fauna);
   f. Cultural Areas;
   g. Heritage Structures;
   h. Inspection & Test Plans;
   i. Bypass Plans.
3. Risk Assessments. This icon directs the user to all of the Assessments that may be required including, but not limited to:
   a. Contract Risk Assessments;
   b. JSAs;
   c. Task Assessments;
   d. Take 5s
4. Equipment. This icon directs the user to all of the Equipment documents that may be required including, but not limited to:
   a. Equipment Risk Assessments (including templates specific to each type of equipment);
   b. Equipment Pre-Starts (including templates specific to each type of equipment);
   c. Equipment Registers including, but not limited to:
      i. Asset Registers;
      ii. Electrical Registers;
      iii. Portable Ladder Registers;
      iv. Lifting Gear Registers;
      v. Harness and Recovery Equipment Registers;
   d. In addition, all Registers have "Out of Service Tag" functionality.

C) Less frequently used risk tools can be accessed through 1 of 5 subsidiary links as shown in FIG. 76:
1. Chemicals or MSDS (chemical registers and MSDS sheets including the ability to source updated MSDS sheets);
2. Calculators (real time calculation tools for calculations commonly completed in the field);
3. Training (access to current qualifications with auto expiry alerts);
4. Emergencies (Step-by-Step Emergency and Evacuation Instructions);
5. Procedures (access to review the employer's existing procedures).

D) All risk management documents are attached to a job number. In addition however, risk documents can also be attached to, and embedded within, a specific JSA. This enables field employees to access all of the risk documents applicable to their job directly through their JSA.

Auto-Population

The described auto-populating of the log document during the process period helps eliminate a challenge in field risk management by ensuring field personnel complete Take 5s (a process period) and Logbooks (a log document) in a timely manner. Take 5s should be completed before the commencement of a new task. Logbooks of each employee's activities should be maintained for specific high risk tasks including Excavator Operation, Dogging, Crane Operation, Long Distance Driving etc.

The disclosed systems and methods provides auto-populating logbooks based on Take 5 data entries and equipment pre-starts. In short, the Take 5 template requires the user to confirm if they will be undertaking any activities for which a logbook should be maintained. If the user selects one of these activities from within the Take 5 template, a pop-up box sources additional information from the user and employs this additional data to auto-populate the user's relevant logbook.

Alerts for Permit and Plans Status

Different Permits and Plans have different validity periods. For example, some Permits and Plans are short term and are valid for several hours whilst others are long term and are valid for 30 days or more. An issue for field personnel is the renewal or re-issue of Permits and Plans to ensure the timely, continuous and safe completion of works. The disclosed systems and methods can provide:

a) Applying a Red Cross against Permits and Plans listed in the JSA that have expired or are about to expire;
b) Permit and Plan Expiry Auto Alerts and also, based on GPS and time stamp data.

Permits are issued to perform certain tasks where certain qualifications, experience or training is required in order to perform the particular job. Permits may have roles assigned to them including a permit issuer, a permit holder, other personnel falling under the permit, a permit tester and a permit clearance provider. Permits may also have responsibilities conveyed by the permit, a start time/date an end time/date and may have time limits. Examples of permits include a permit to work on a particular job site, a permit to perform excavation, a permit to perform asbestos removal, a permit to perform hot works, a permit to work in a confined space, a permit to work at heights, a permit to work in the vicinity of high voltages, a permit to use a quick cutting saw and a permit to use high-pressure water jetting. Other permits can be provided as required.

Figure 16:
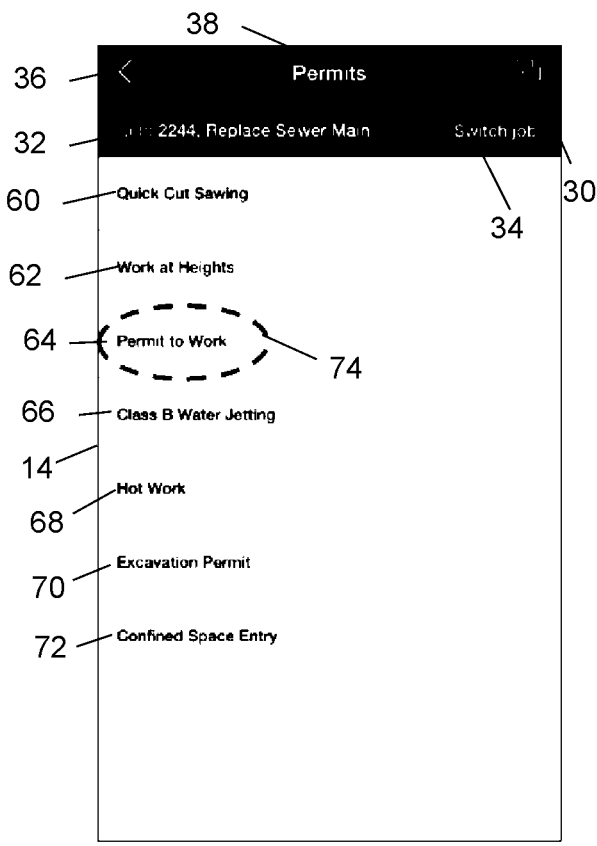

The permits menu 14 is shown in more detail in FIG. 16. This screen includes the screen heading 38. For permits it also includes an information bar 32 beneath the screen heading 38 that indicates the job for which the listed permits are applicable. It also includes an option to switch jobs by selection of 34. The heading also includes a back-arrow 36 to go back to the home screen 12. It also includes the message icon 30 so that the arrival of messages can be seen from this level.

Figure 17:
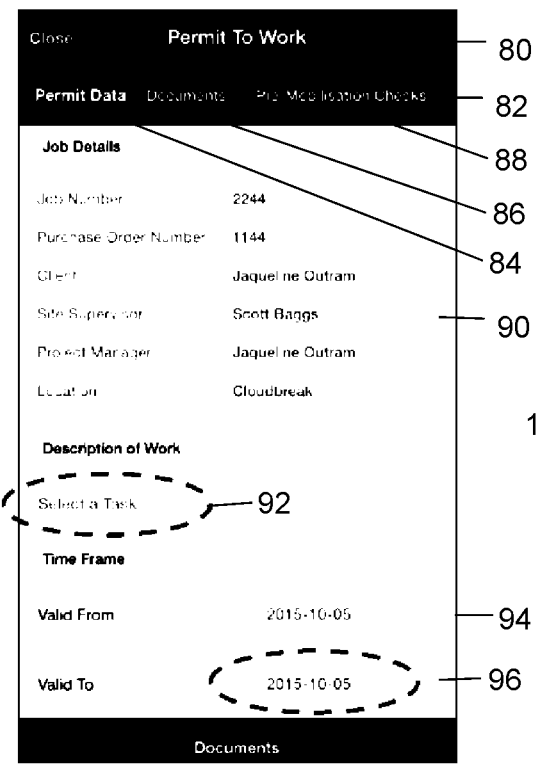

The permits for this particular job are listed, and in this example, where the job is the replacement of a sewer main, the permits are to: operate a quick cut saw 60, permit to work at heights 62, permit to work on the site 64, permit to use a class B water jetting 66, permit to perform hot work 68, permit for excavation 70 and permits to work in a confined space 72. The permit to work 64 can be selected by pressing in the vicinity of 74. This will open up information about this particular permit, as seen in FIG. 17. FIG. 17 shows a screenshot displayed by the mobile application on the type of device display screen, at the top is the heading of the permit 80, which is a permit to work. There is a menu bar 82 that shows details about the permit. The user can select different types of categories of information about the permit. In this case there is permit data 84, documents about the permit 86 and pre-mobilisation checks 88. Each of these can be selected. In this instance the permit data tab is highlighted and in the window 90 information about the permit to work is provided. The permit has a time frame within which is valid, starting from the date indicated by 94 and the valid-to date indicated by 96. The highlighted area 96 is selected so that this date can be changed. Furthermore the description of the work performed can be selected 92 so as to define the type of work to be performed. Data accessible by the field personnel is able to be automatically loaded into memory of the portable device and then displayed because it is automatically retrieved from the database. The expiry of the permit may be reset to a maximum allowed period.

The issuer of the permit holds responsibility for checking all of the permits. The issuer of the permit can be guided by references checks and interventions. The holder of the permit holds responsibility for checking work is performed according to the permit.

Figure 18:
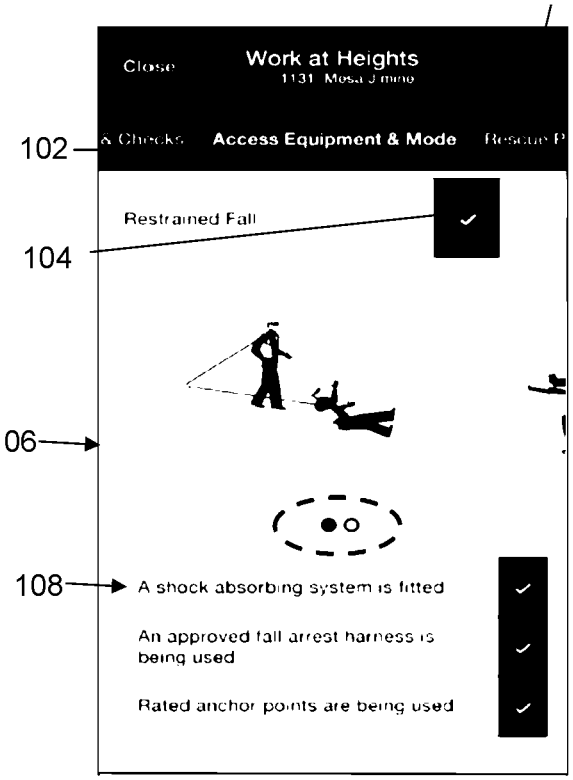

Referring to FIG. 18, which shows an example of a work at heights permit displayed in the title bar 100 and the menu item "Access Equipment & Mode" in menu slider 102 is selected and highlighted. This provides information to the user including a visual guide as to the nature of this permit and what is required in order for it to be issued and all constraints required for this permit. There is a requirement to restrain the person falling as indicated by 104. There is a visual guide as to what the permit entails at 106 and equipment required to operate in this environment is displayed at 108.

Figures 19, 20, 21, 22:
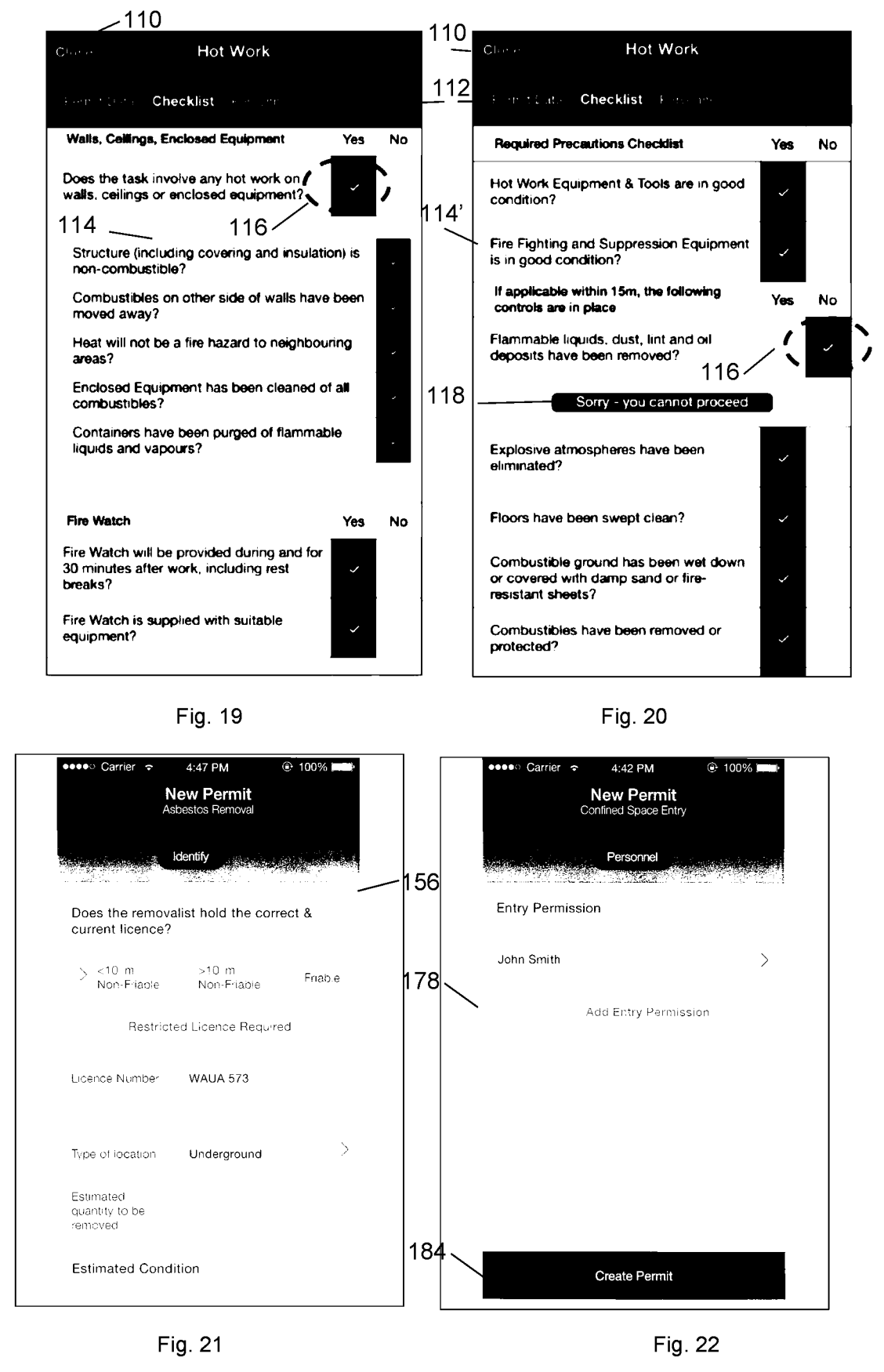

Referring to FIGS. 19 and 20, which are examples of a Hot Work Permit, as indicated in the heading 110. The items of a checklist for the permit can be selected in bar menu 112, and the items are listed in window 114. A checklist item asks "does the task involve hot work of walls, ceilings or in closed equipment?" If that is the case, the yes box 116 can be checked as indicated. This may bring up additional requirements related to that situation.

Referring to FIG. 20, which shows further aspects of the checklist 114'. When an item required to be checked is not so, as indicated by 116, then a notice 118 may be displayed indicating that the work cannot proceed because all the requirements, as per the checklist, are not met. This allows field personnel to know what the requirements are, and to go through a process of checking that requirements are met. If any of the items required are not met, then they are given notice that they are not allowed to proceed with the work. This also allows the person to change the answer if the circumstances change. In this example where the requirement of the checked item can be met, that will then interactively and automatically change the notice 118.

Everyone on the permit can receive role-specific notices. Personnel allocated to the permit may be listed and reminders can be provided so that the user is able to know what sort of permit is required in order to perform the job. The user may be required to review and actively accept a permit, so that they indicate they understand and there is a record of the understanding of the permit, that it has been allocated to them and they are accepting their responsibilities for their role in the risk related to this particular permit.

Figure 4:
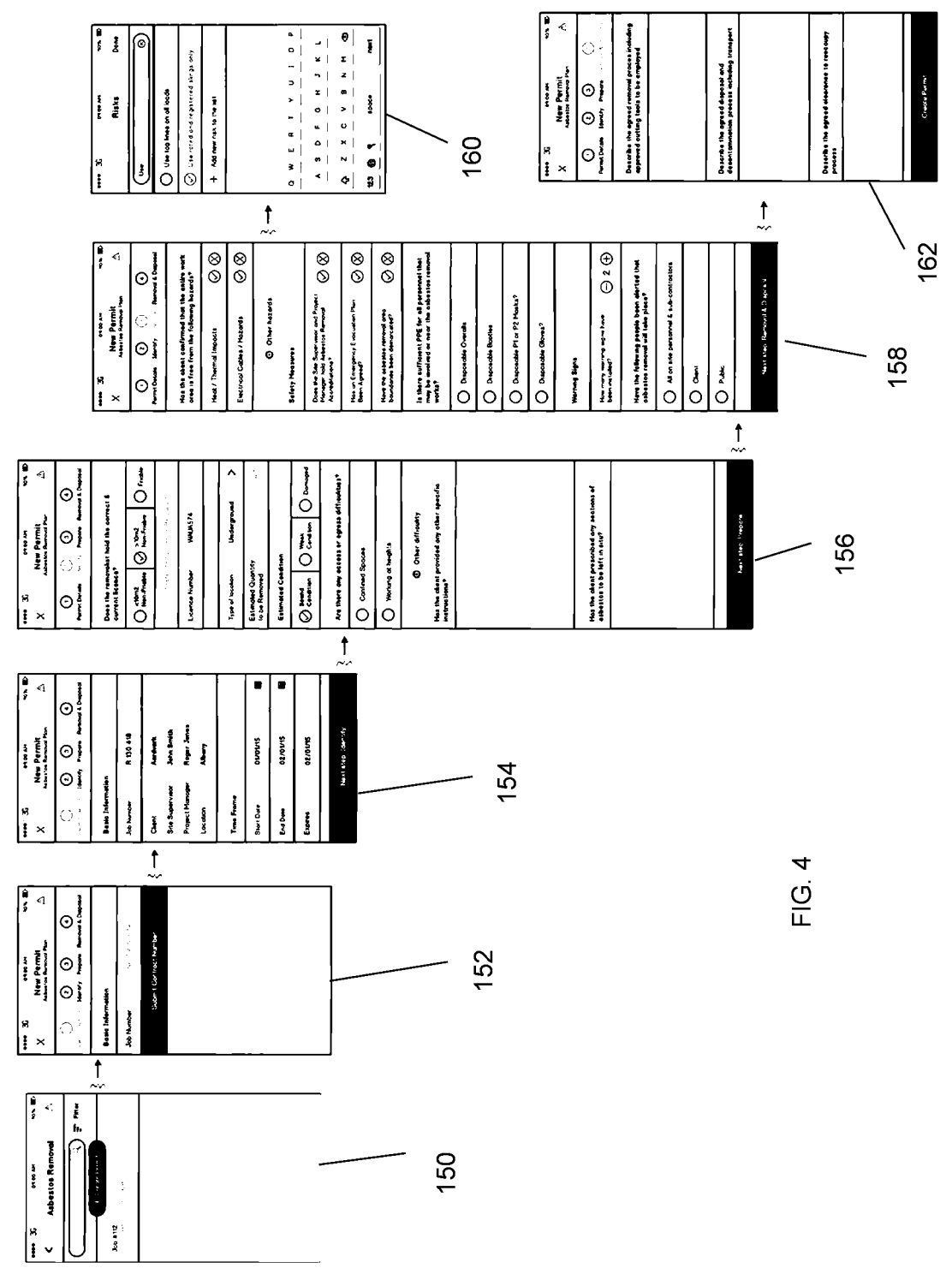

A new permit can be issued as shown in FIG. 4. For example if an asbestos removal permit is required as indicated by 150. A create new permit icon can be selected in 152. The user is taken to screen 154 which provides the permit details including job details and tasks required for the permit. They can then advance to the next screen 156 which is to identify the type of asbestos removal required as indicated in FIG. 21, which more clearly shows some of the information required. In this screen the user is able to enquire whether the removalist holds the correct and current licence "less than 10 $m^2$ of not friable asbestos". Other details are provided as indicated at 156. Once entered the user is able to progress, and to provide information about the job requiring the permit and risk particular to this job in screen 158. Information is able to be entered into checks boxes or as free text in screens 160 and 162.

Figure 5:
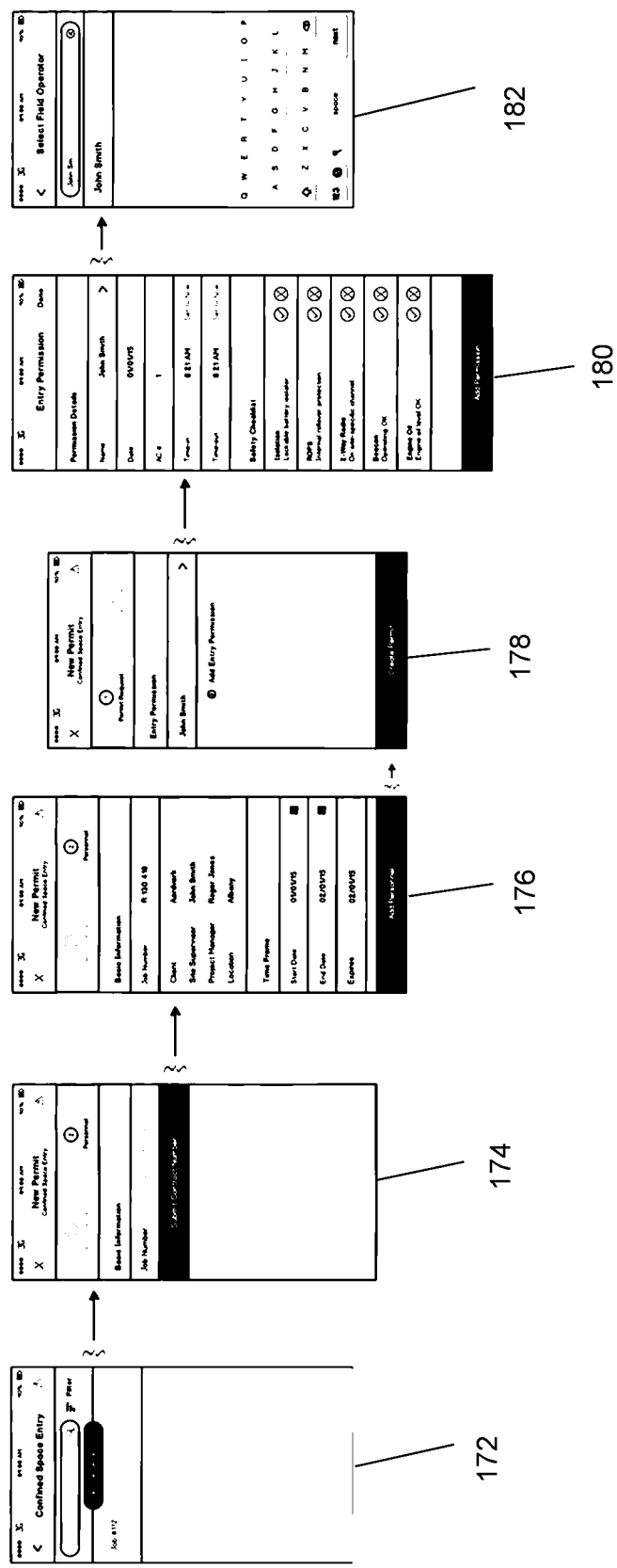

Another example of the creation of the permit is shown in FIG. 5 which is to create a confined space entry permit, commencing at 172 shown in more detail in FIG. 22. The basic information about the permit is shown in 174 including job details and tasks required for the permit. Personnel are allocated to the permit at 176 and as shown in FIG. 22. Information about the safety requirement for the permit are entered in 180 and 182.

Figure 6:
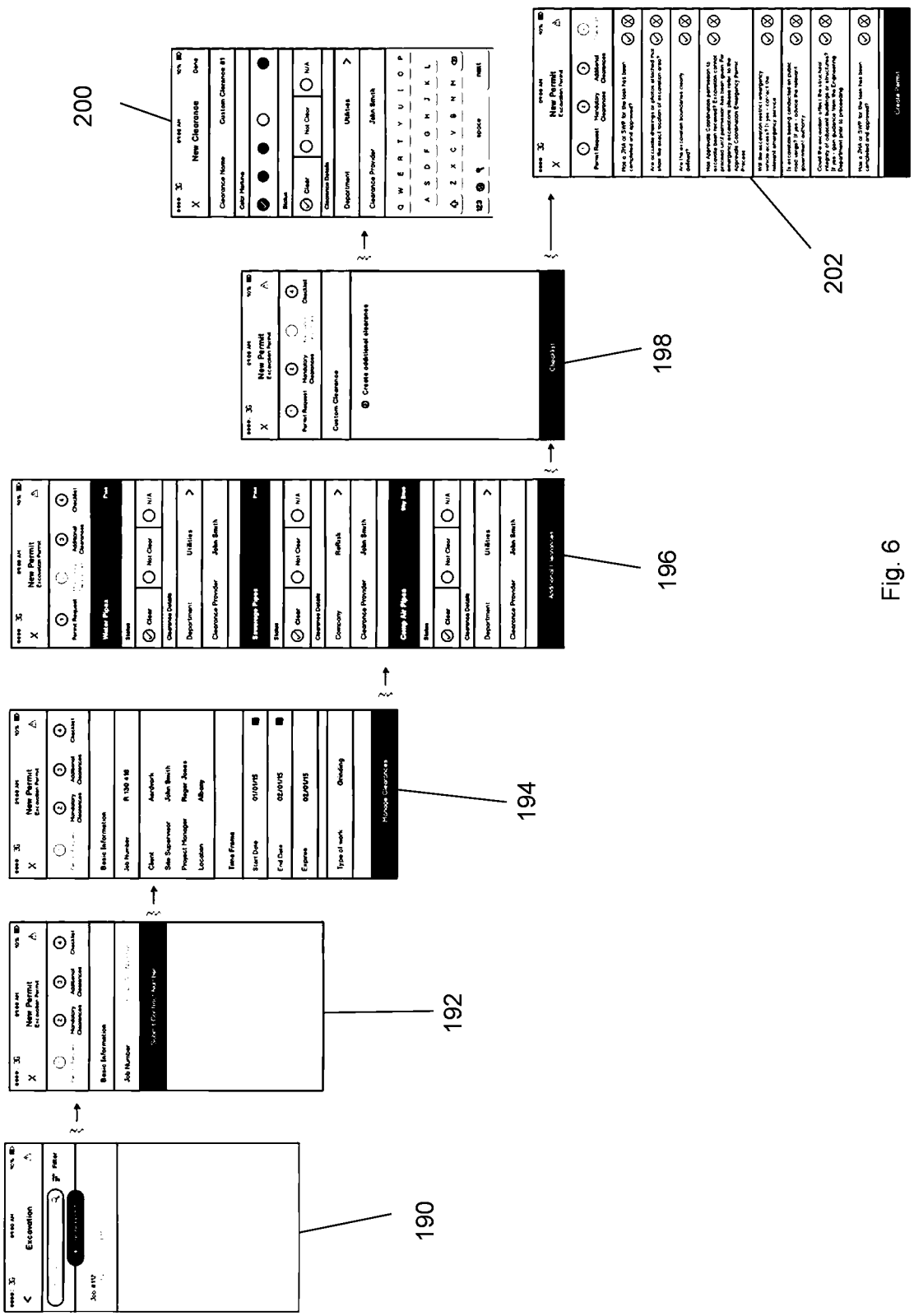
Figure 23:
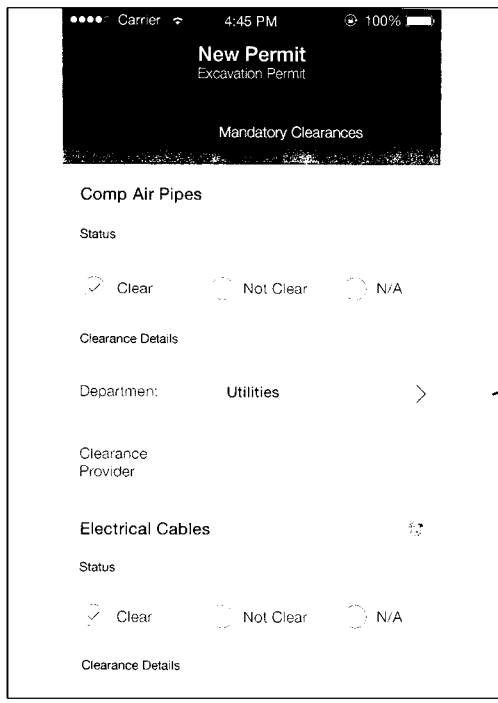

A further example of a permit for excavation is shown in relation to FIG. 6. Creation of the permit begins at 190 and then progresses to 192 where basic information about the permit request is displayed including job details and tasks required for the permit. Tasks required and requirements of the tasks including clearance requirements in relation to the excavation are entered in windows 194, 196, 198, 200 and 202. FIG. 23 shows a portion of 196 in more detail. In this menu item information can be entered by selecting checkboxes.

Figure 7:
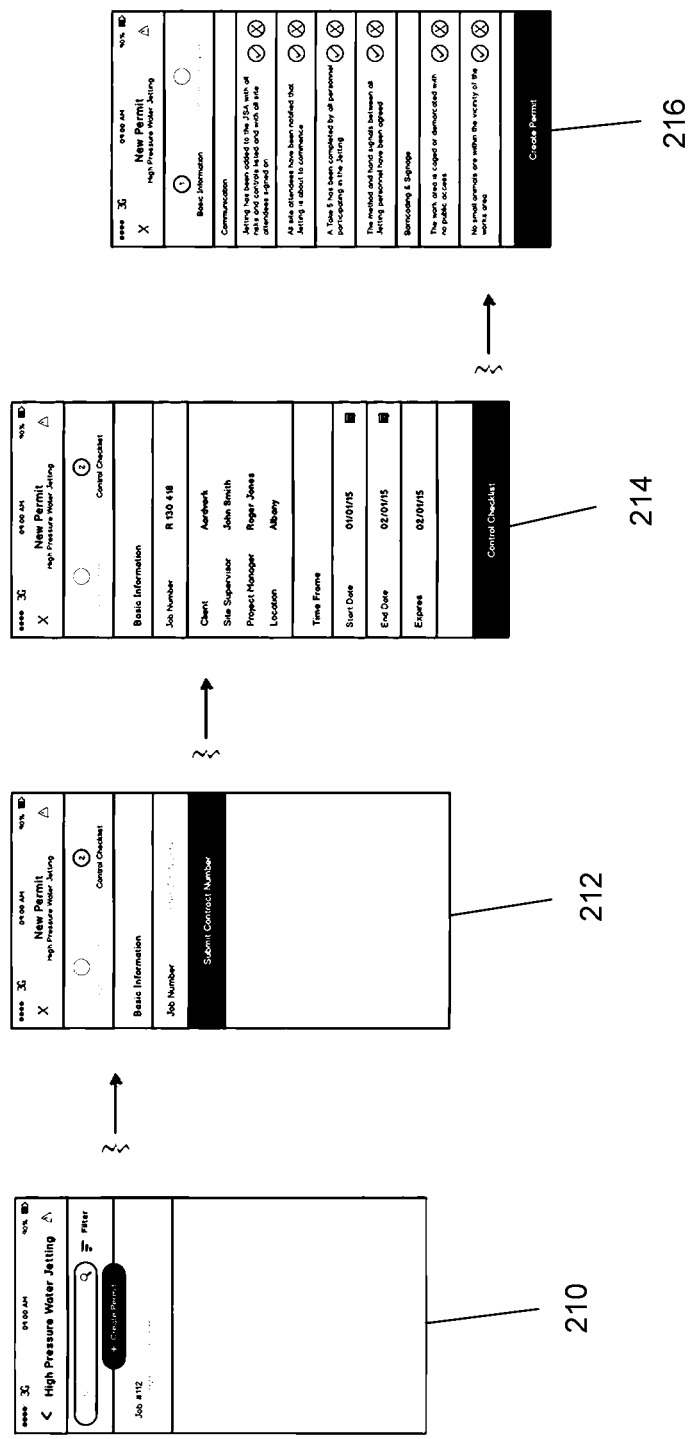
Figure 24:
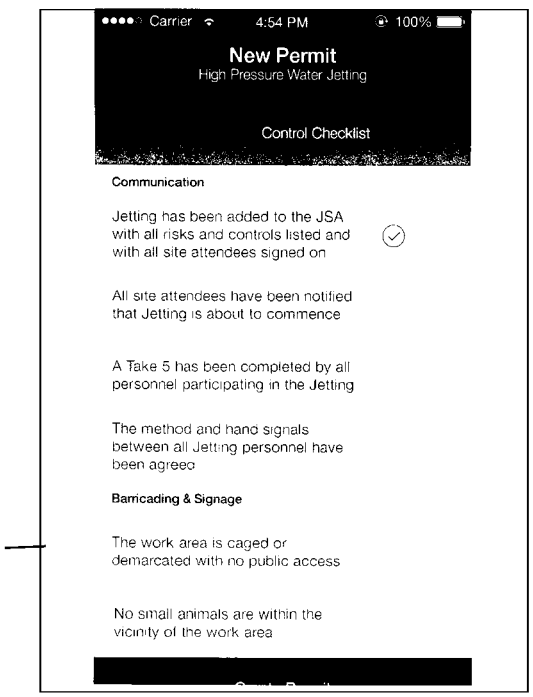

A further example of creation of a permit for high-pressure water jetting is shown in relation to FIG. 7, which commences at 210 with details about the permit being shown in 214. The process progresses to more entry of more detail in 216 and as shown in FIG. 24. Information about the requirements for this permit can be entered by the completion of checkboxes.

Figure 8:
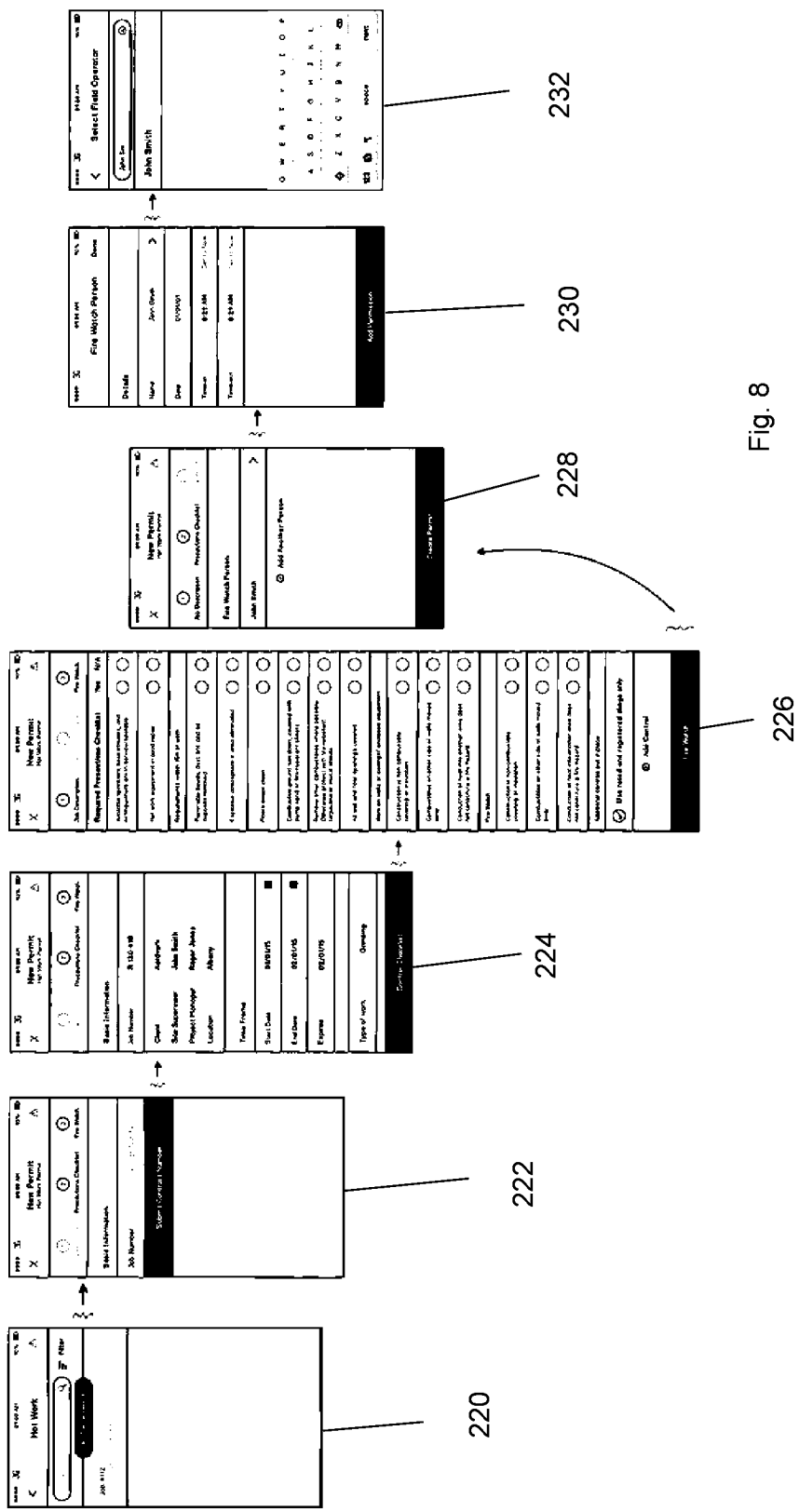
Figure 25:
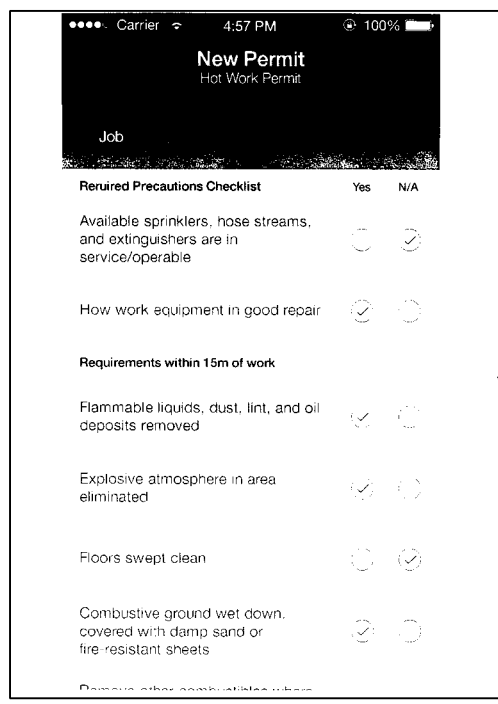

A further example of creation of a hot work permit is shown in relation to FIG. 8, which commences at 220. Basic information about the permit is shown in 224. Information about the job is then entered in 226 and as shown in more detail in FIG. 25. Precautions about the work and a person permitted to assist in performing the hot work are also entered in 228, 230 and 232.

Figure 9:
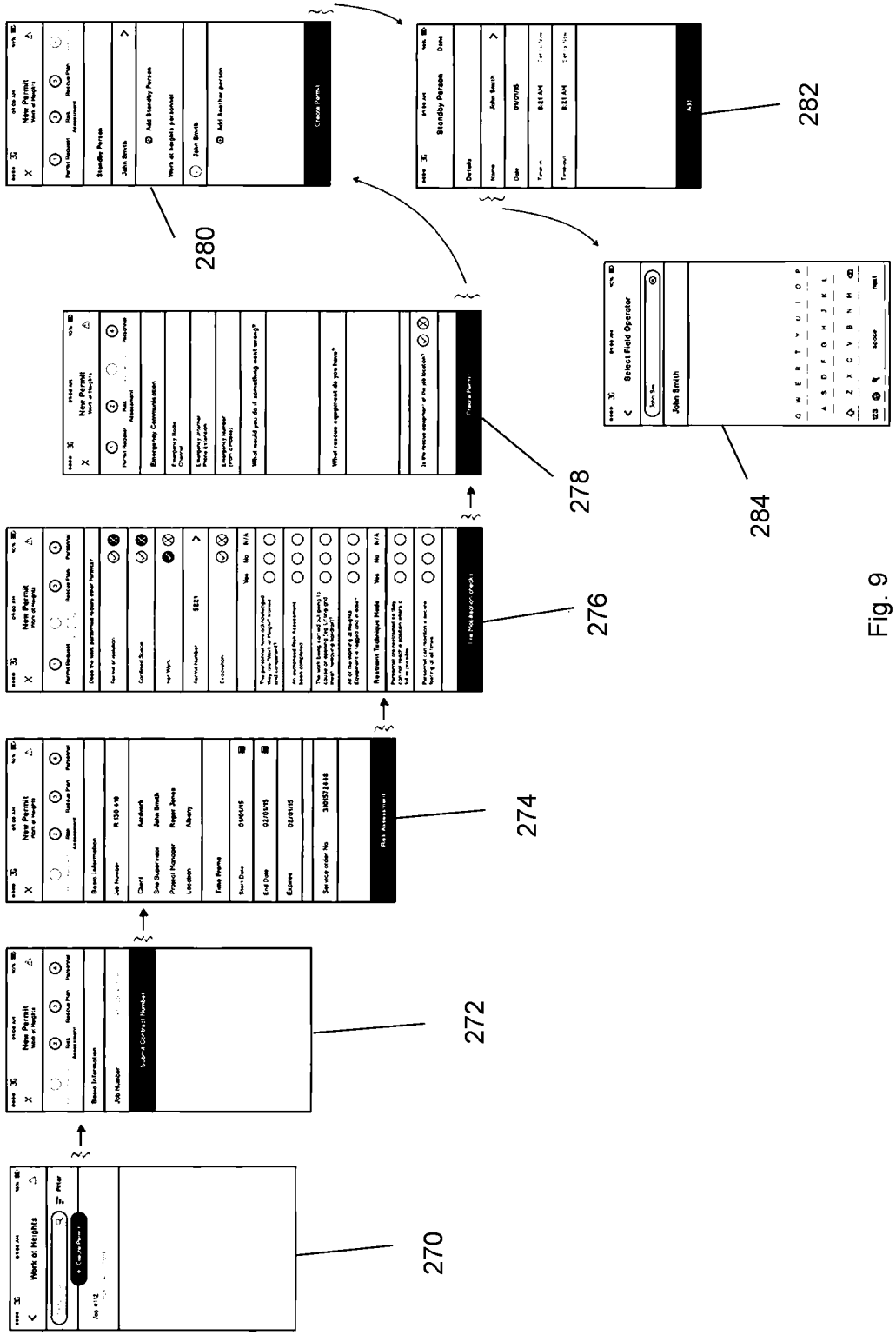
Figure 26:
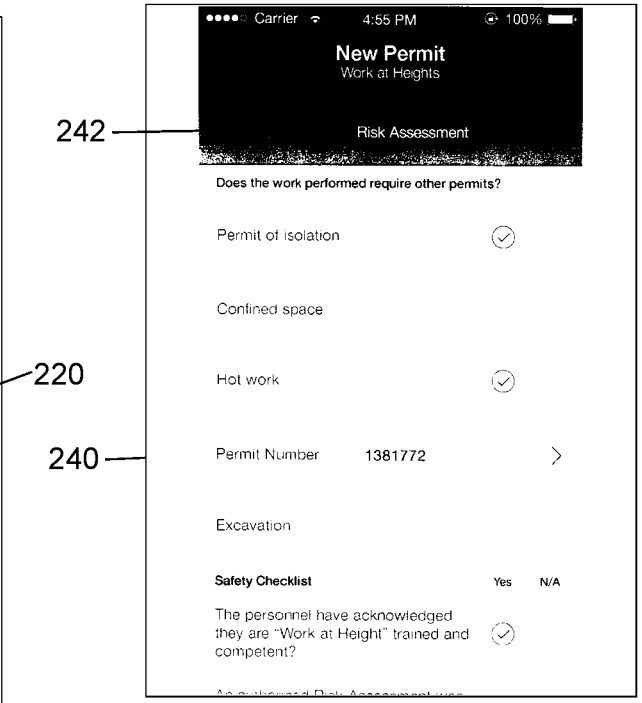

FIG. 9 shows an example of the issuance of a working at heights permit, commencing at 270 and then progressing to 272 and then 274 where basic information is provided. Information about the nature of the work required is entered in 276, which is shown in more detail in FIG. 26. Further information is entered at 278, such as a rescue plan and information on a stand by person, in 282 and 284.

Figure 27:
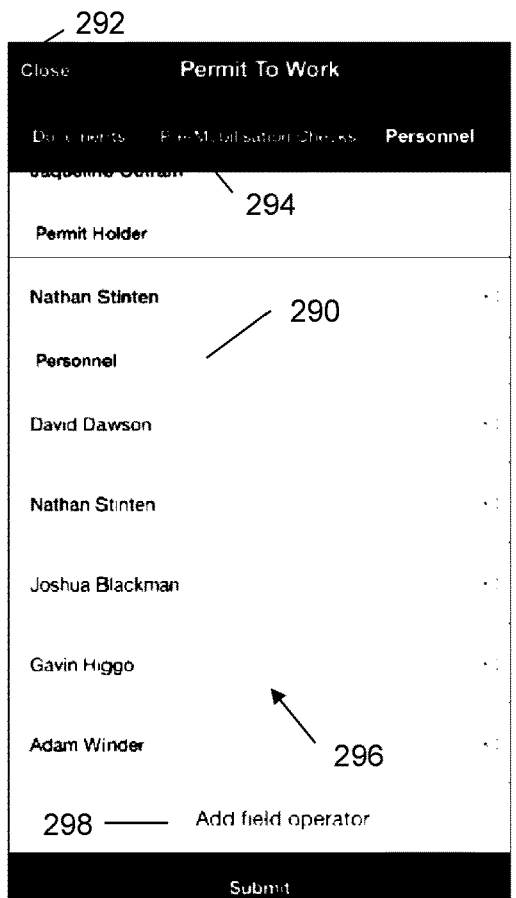
Figure 28:
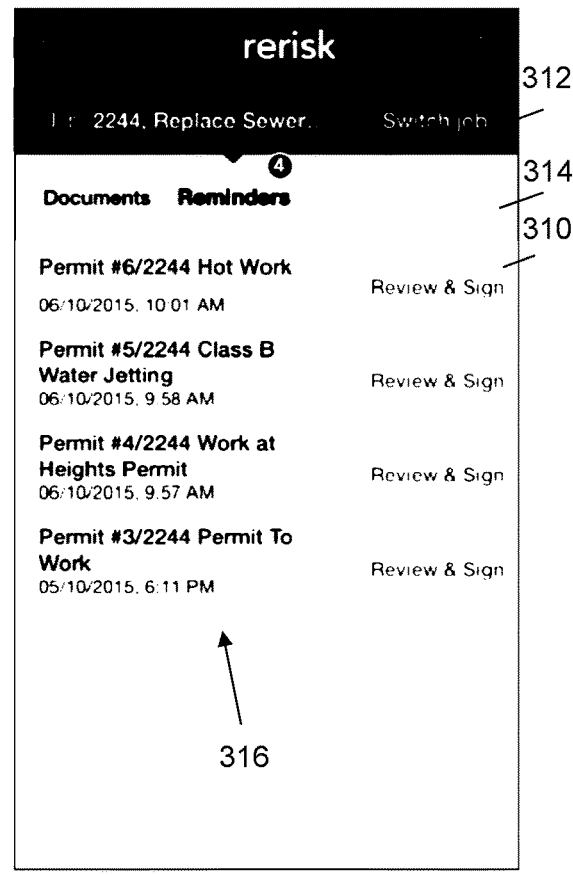
Figure 29:
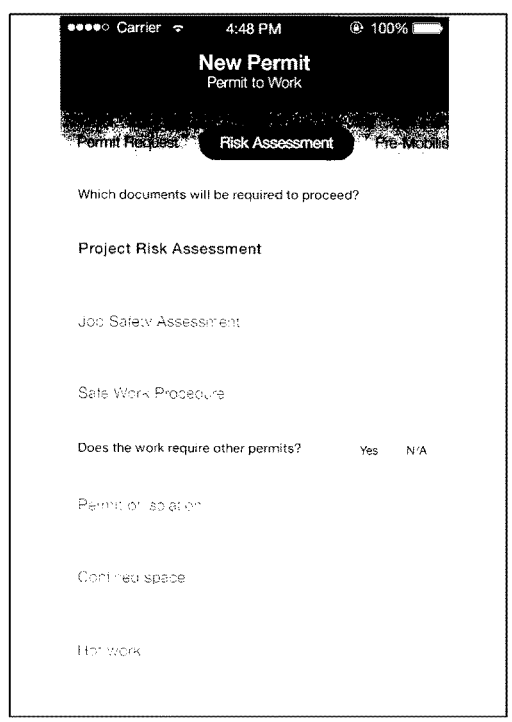

An example of a general Permit to Work is shown in FIG. 29. Each permit to work that is used in relation to various personnel, such as indicated in FIG. 27 indicates the list of personnel permitted to work in the worksite. The list may be generated so as to only show personnel to whom the permit holder may be transferred if the holder is seeking to transfer the permit. The list may be generated so as to only show personnel to whom the permit holder may add personnel able to perform the work of the type for which the permit is given. Each person involved in each permit is provided with reminders of the need to review and sign each permit to work that involves them, as indicated in FIG. 28.

The term of the permit can be tracked and prior to the expiry of the permit, the holder can be notified so that action can be taken if an extension or new permit is required. When the work undertaken under a permit is finished, the permit may be closed. The permit holder and issuer are notified when there are changes made in relation to the permit.

Risk Assessments

Figure 30:
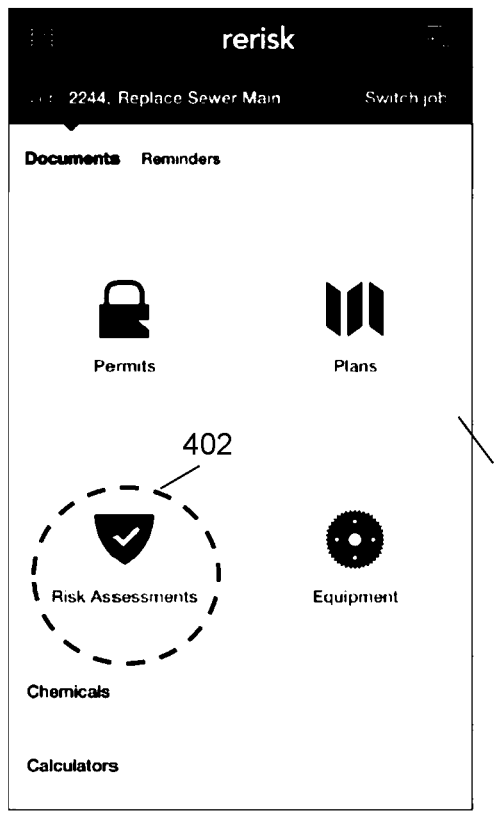
Figure 31:
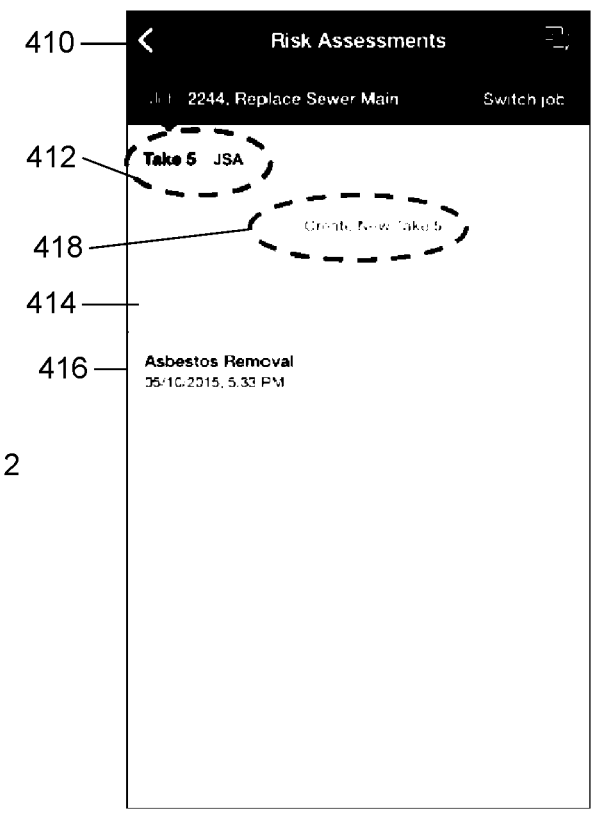

FIG. 30 shows the home screen 12 and selection of risk assessments by touching the screen in the area indicated by 402. This then takes the user to the menu 20, also shown in FIG. 31. The consistency of presentation is demonstrated, with the heading at the top 410, with the back-arrow and message icon. The job is listed underneath. Then slide menu bar 412 allows the user to select the type of risk assessment being made. In an embodiment the types of risk assessment are JSA or Take 5. Take 5 is selected and therefore highlighted. A list of existing risk assessments is provided at 416. A search of existing Take 5s by task or date can be entered at 414. A new Take 5 can be entered at 418. Take 5s will be described further below.

Figure 32:
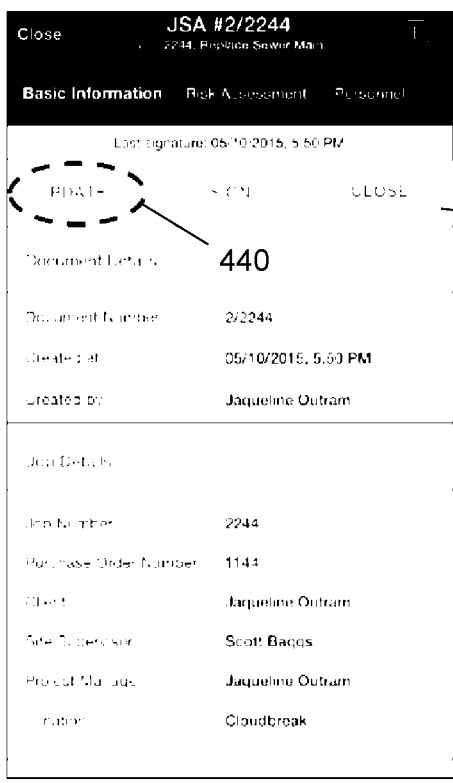

JSAs can be issued, updated, or transferred until closed. When JSA is selected as the risk assessment and an existing JSA is selected, the device will display basic information about the JSA in window 438 of FIG. 32. The Basic Information option is selected in the slide menu bar 434 under the name of the JSA in the heading 432. Other options aside from basic information in the menu 434 are risk assessment personnel. The JSA is provided with an identification number indicated in the main menu top menu 432. There are also options to sign the JSA or close the JSA and Update the JSA as indicated by 440.

Figure 33:
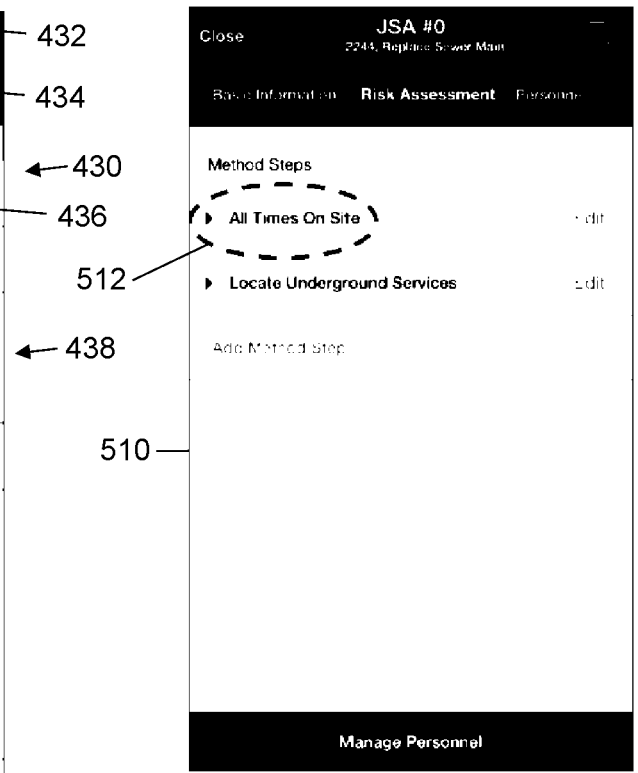
Figures 34, 35, 36, 37:
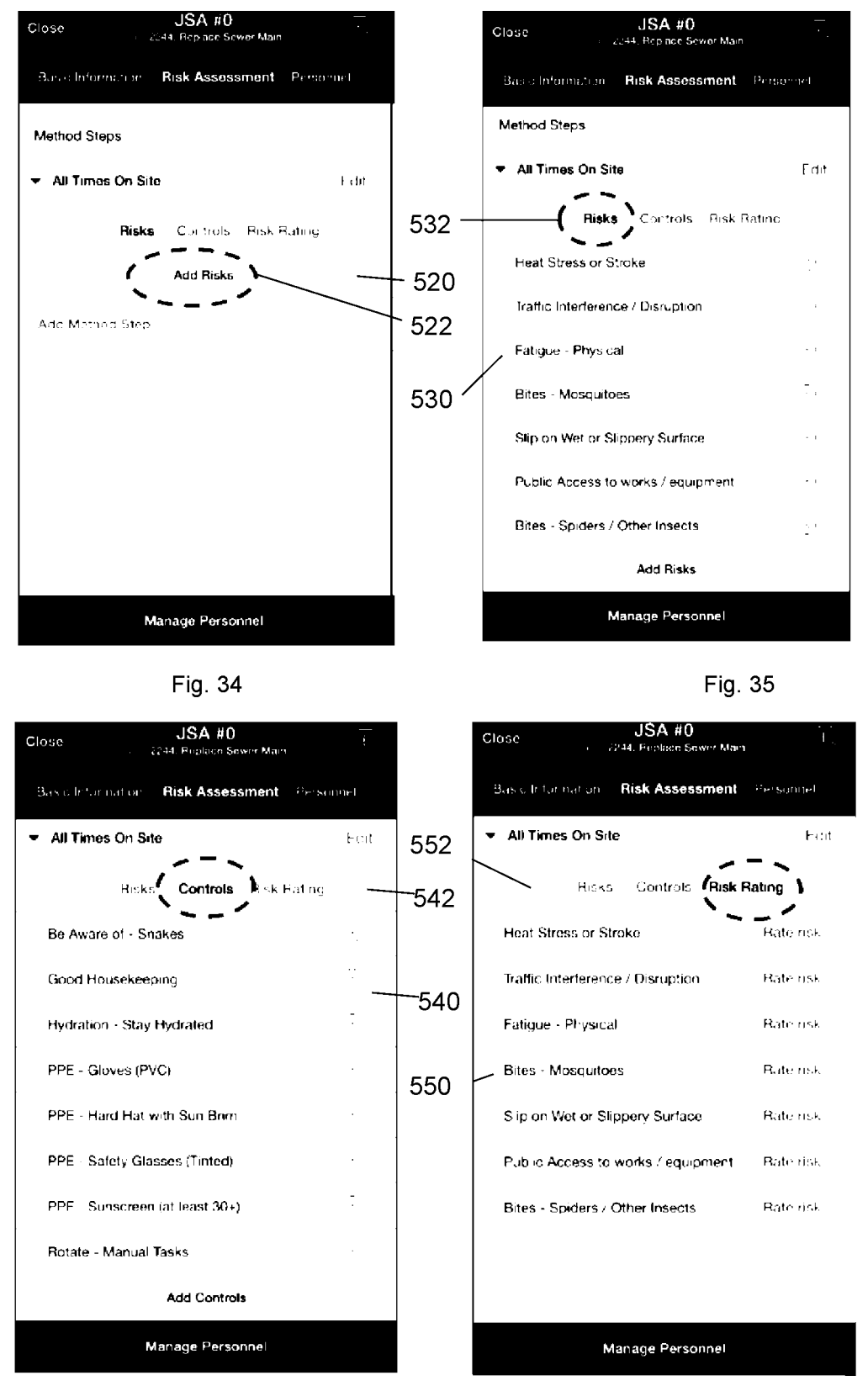
Figures 38, 39, 40, 41:
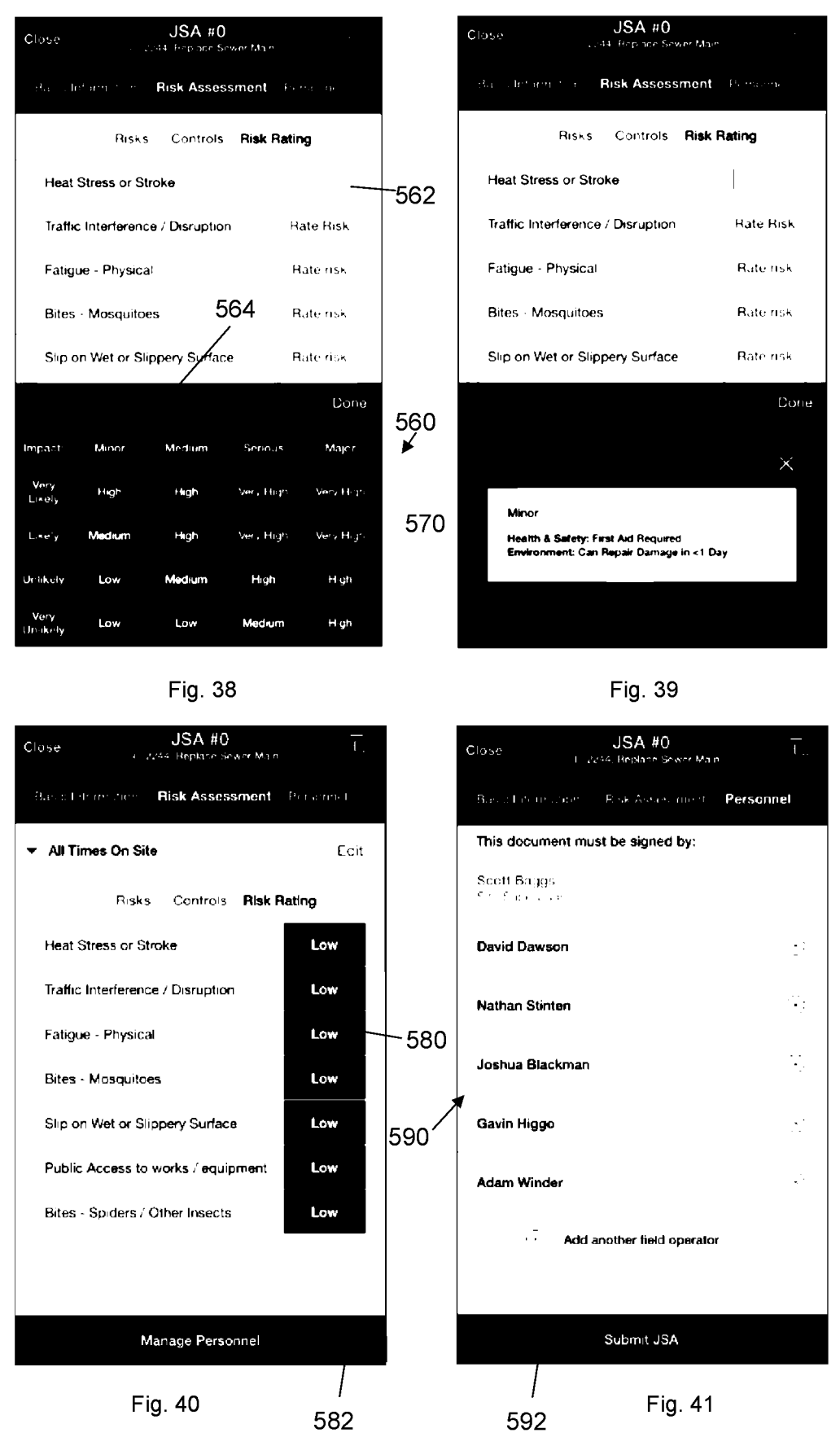

FIG. 33 shows a window 510 in which method steps of the risk assessment are able to be selected. Selection on the highlighted area 512 opens the "All times on site" as indicated by 520 in FIG. 34. This then allows the user to add risks to the risk assessment. Upon selecting the add risks area 522, a list of risks is displayed at 530 in FIG. 35. A user is able to select from those risks and add them to the risk assessment. The user is then able to swipe over the controls as indicated in the next menu item next to the risks item 532. This opens controls available to mitigate against risk as indicated by 540 in FIG. 36. The controls heading is highlighted in menu 542. The user is then able to select a risk rating, in 550 of FIG. 37. When an unselected risk rating is selected, a pop up risk matrix opens 560 in FIG. 38. The choices available depend on the impact and the likelihood as each axis of the matrix. The impacts are selected from minor, medium, serious and major. The likelihood is selected from very likely, likely, unlikely and very unlikely. The sections on these axes determine the risk rating. The impact of minor has been selected as indicated by 564. This opens a pop up shown in FIG. 39 describing the meaning of a minor impact in terms of health and safety and environmental impact. FIG. 40 shows all of the risks selected have been given risk ratings.

The assessment of the risks can then progress to allocation of personnel as per FIG. 41. Personnel impacted by this JSA can then be listed at 590, which also includes details of the site supervisor. The JSA can be submitted by selection of the submit button 592. This then issues a notice as indicated in FIG. 42 to all of the personnel listed in FIG. 41, which shows in their reminders as indicated in FIG. 42. They are can review and sign the JSA. Should circumstances indicate, they may be able to update the JSA.

Figure 10:
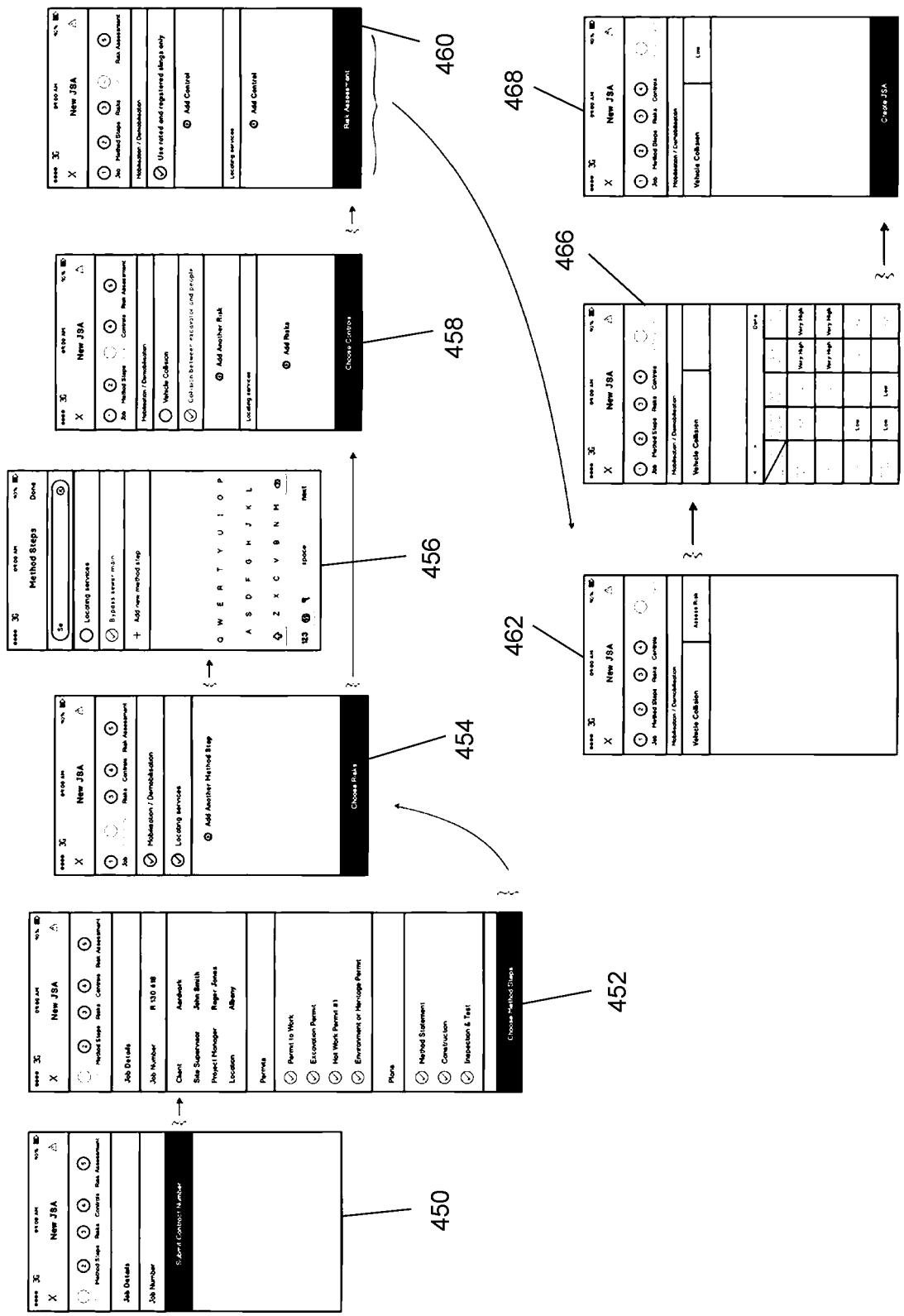
Figure 46:
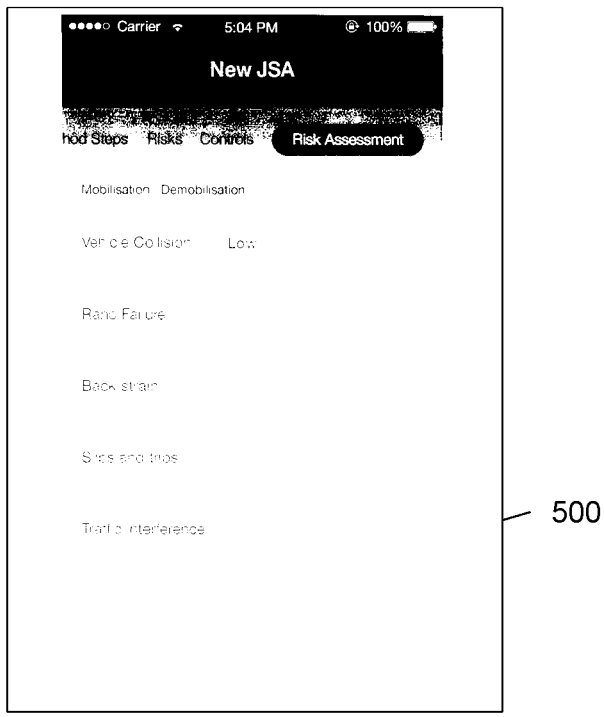

FIG. 10 shows the process of creation of a new JSA. When selected from the main menu the process starts at 450, which as noted above is also shown in FIG. 31. Basic information about the New JSA is shown in 452, also shown in FIG. 43. Method steps are entered in 454, also shown in FIG. 44. Risks are then chosen from a list. An example of search for risks in the list is shown in FIG. 45, with selected risks listed in FIG. 46. Controls and Risk rating are then made in steps 460 to 466 and then personnel allocated in step 468.

Figure 11:
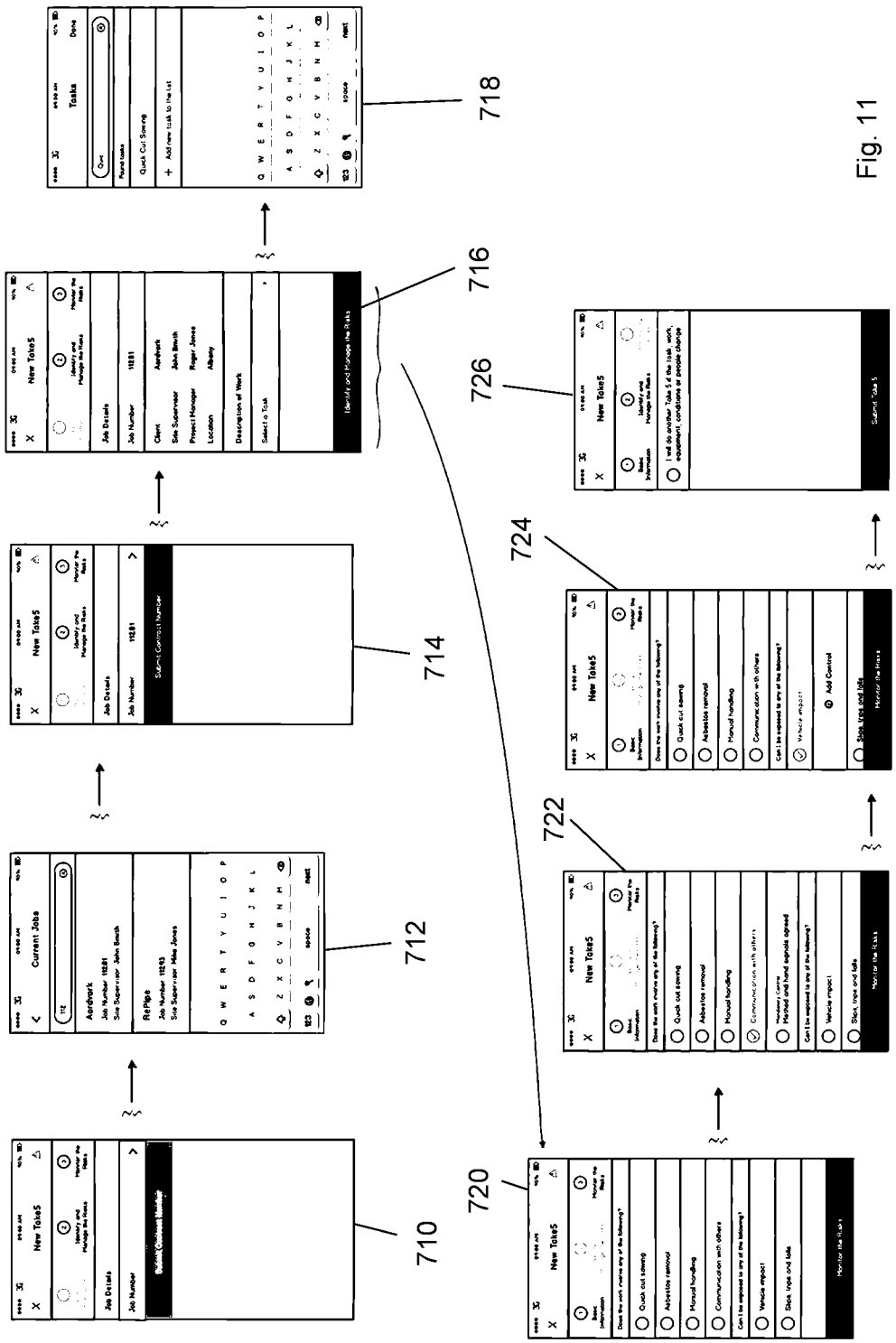
Figure 47:
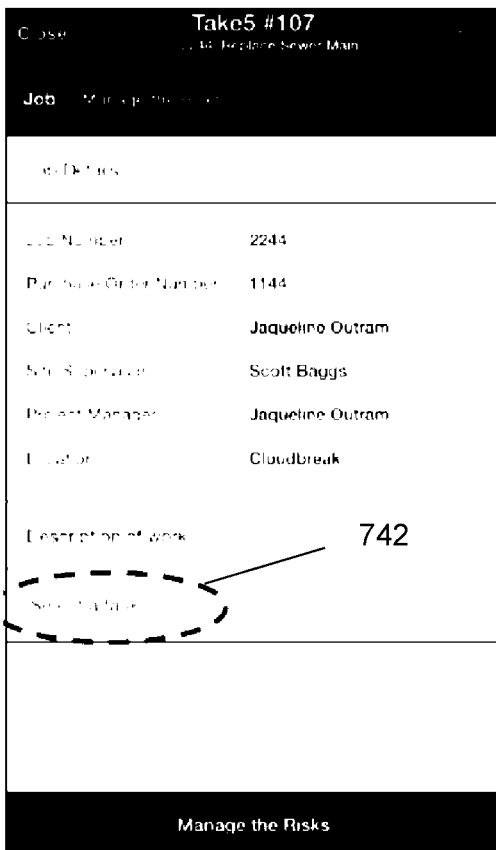

Take 5s are specific to the user, but are still retained centrally, and are still with the dynamic interface of the documents. The user assesses the risks for themselves before commencing a task. FIG. 11 shows the process, which starts by selection to perform a Take 5 as indicated by 710. The user can select which jobs they are working on at 712. Details of the job come up at 714, and then if they select the job, further details of the job are presented at 716. FIG. 47 shows the screen form. The user can then select 742 a task to be performed from a list of common tasks. The user can scroll or search the list.

Figure 48:
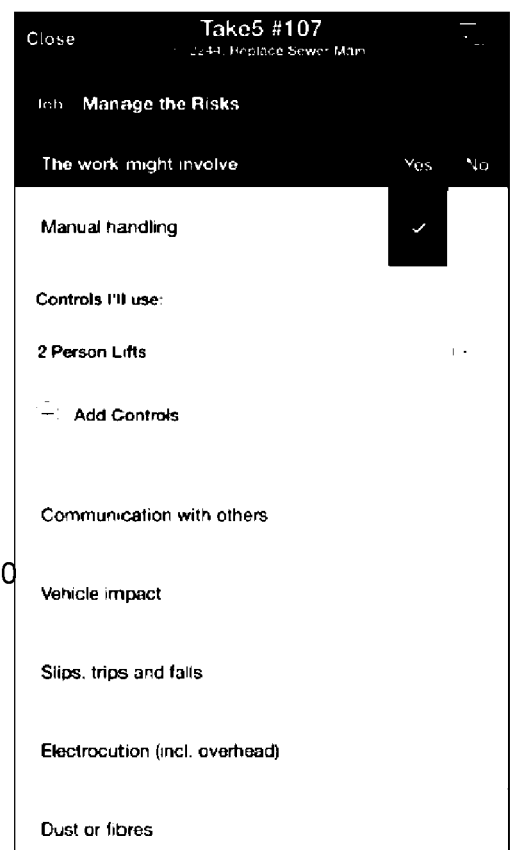

FIG. 48 shows a list of risks that might apply to the selected type of task. The risk can be selected at 722. Then a list of controls that can mitigate the risk can be shown in 724.

Figure 49:
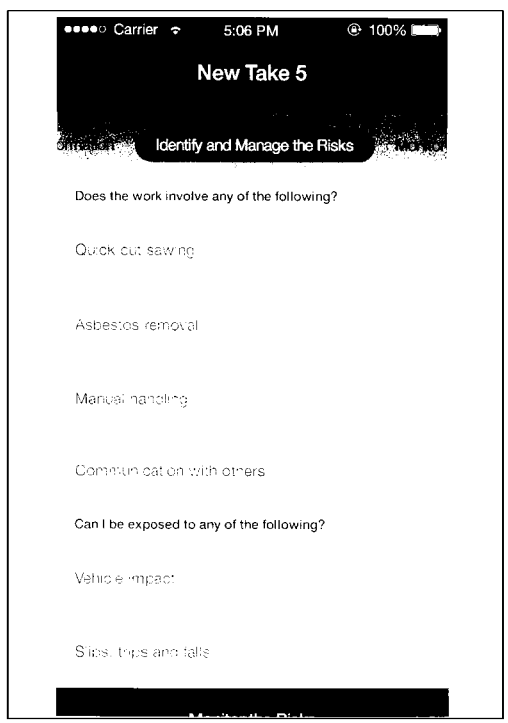

Additional menu options in FIG. 49 provide information about what the risks might entail and a reminder to monitor for the risk. This is also able to monitor risks and if something changes they can then make the user complete another Take 5 and reassess the risk and what controls might be applied to mitigate the risk.

Equipment Pre-Start Visual Prompts

When completing Equipment Pre-Starts, personnel can become confused about which component of the equipment a specific check relates to. This is particularly the case for personnel that struggle with reading (eg. dyslexia). The disclosed systems and methods provide:

a) Diagrams of the equipment with each component numbered according to equipment check numbers;

b) Highlighting (via colour change) the component that each check relates to.

For example, in the Quick Cut Saw Pre-Start template, check number 11 relates to the cutting blade. A diagram of the quick cut saw therefore numbers the blade "11" and as the user scrolls over the blade check questions, the blade in the diagram changes colour.

Figure 12:
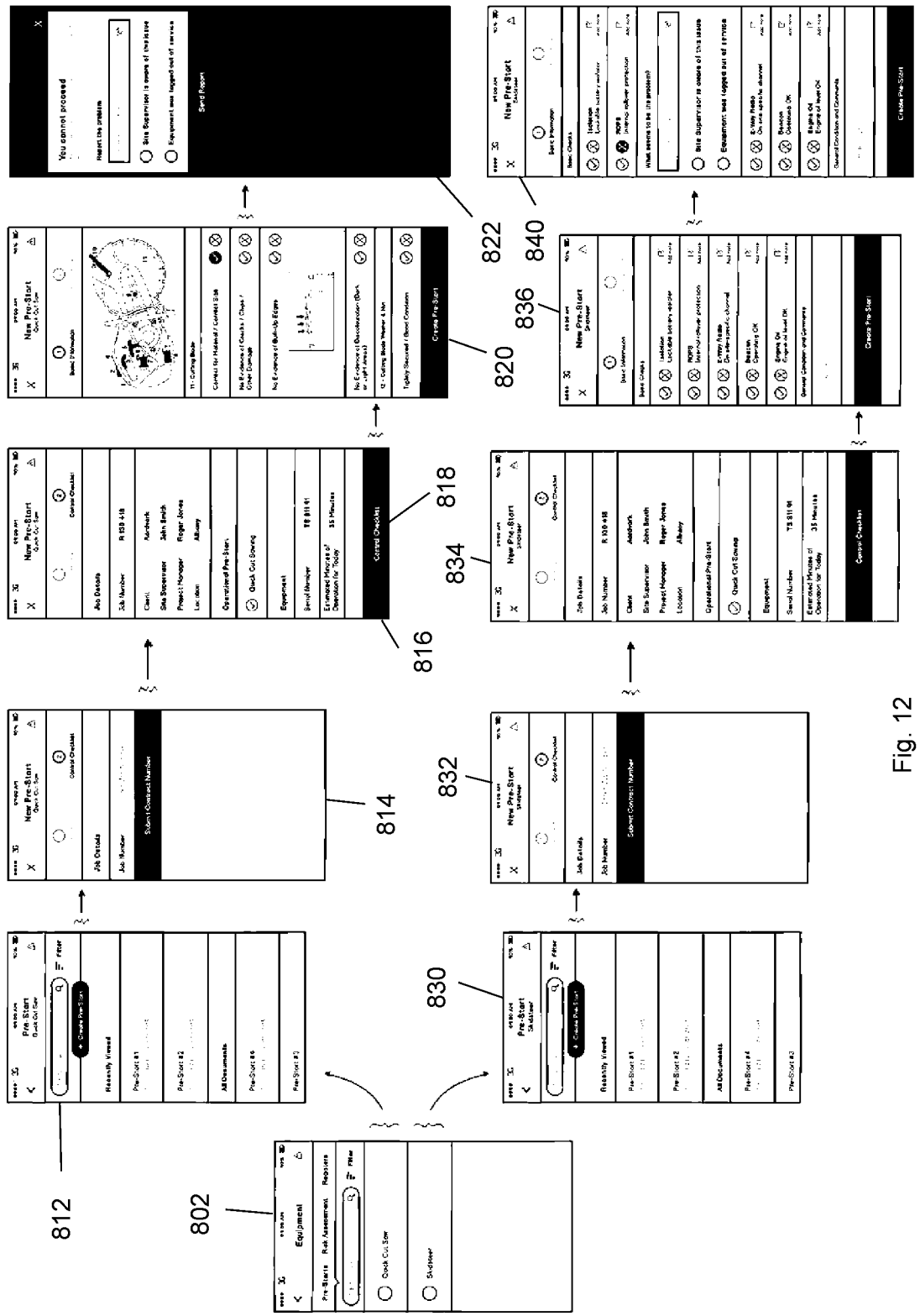
Figure 50:
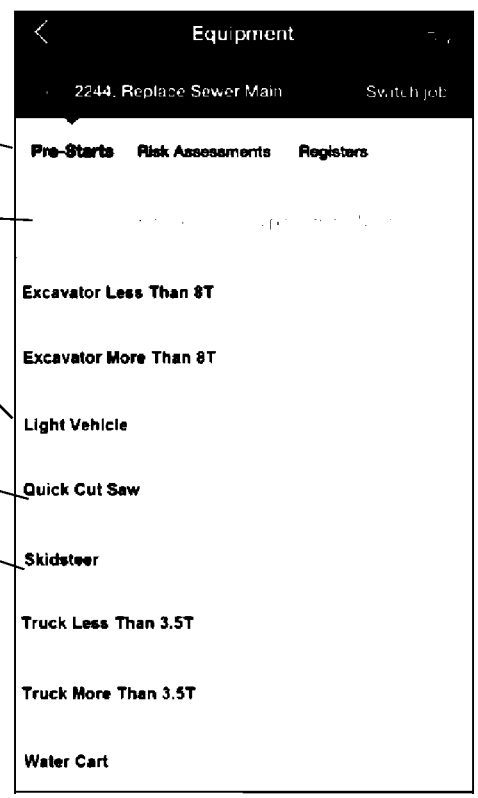
Figure 51:
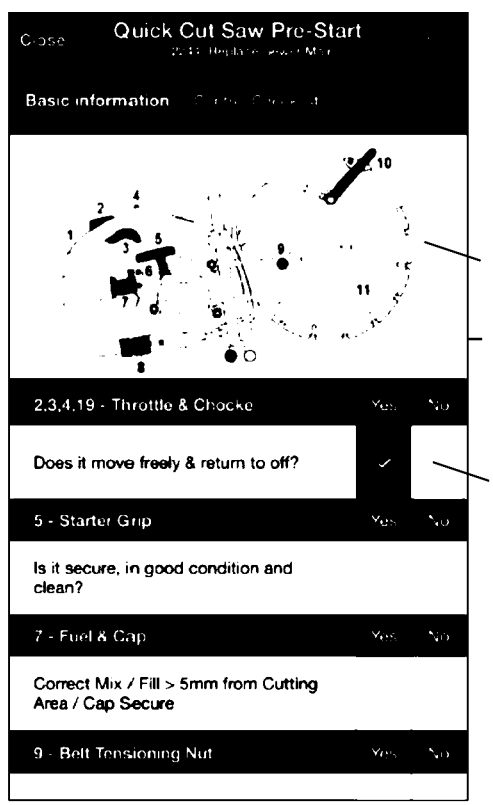
Figure 52:
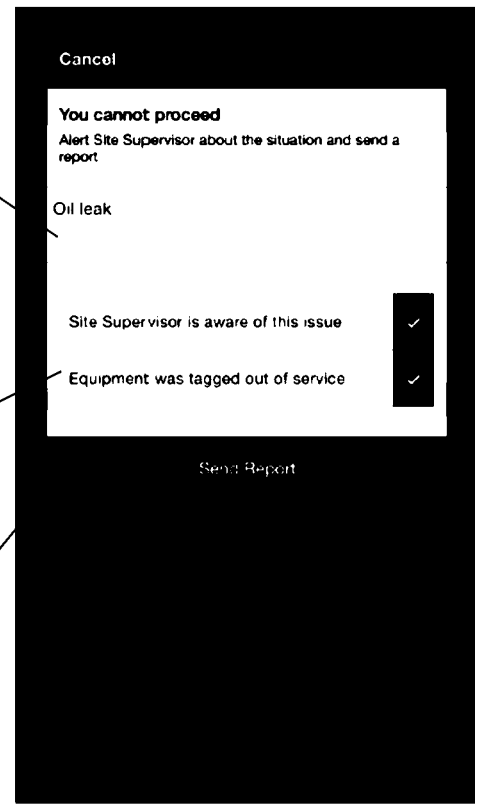

From home screen 12, equipment can be selected and submenus provided 800 as seen in FIG. 12. The menus comprise a list of equipment provided or available for use on the job. The user can select an item of equipment to perform pre-starts, risk assessments or view registers in FIG. 50. A list of equipment used for the selected job is shown in window 802. Alternatively the user is able to search at 804 for particular items of equipment. Risk assessments in relation to particular equipment and registers are static, but pre-starts checks are specific and dynamic. When a pre-start item of equipment is selected a templated set of checks is shown, that is able to be interactive. For example, if the user selects a quick summary of the item given in 818, then a set of control information then appears as shown at FIG. 51 and item 820. The user can then see specific details about that item of equipment. The user can go through basic information about this particular item of equipment that can include checkboxes of things to check in order to ensure that the item of equipment is in good working order. The user can answer the questions indicated in 852. If one of the answers indicates that the equipment is not in good working order, as is per menu item 822 and as shown in more detail in FIG. 52, the user will be provided with information that the equipment is not in good working order. For example, in the case shown in FIG. 52 that the item of equipment has an oil leak as indicated by 862 and is in this instance out of order. These are items for the user to report, including to the site supervisor and tagging equipment as being out of service. The reports can be automatically sent by the selection of the "send report" button 600 and 864, which by virtue of the information already provided allows open areas of the form to be automatically completed.

Returning to FIG. 12 the item for selection shows that if the user requires use of a skidsteer 808 which is another item of equipment needed, then another pre-start is used. The process then proceeds from 830 to 840 to go through and check the pre-start requirements for that piece of equipment.

Equipment Heavy Usage Checks

When completing an Equipment Pre-Start, users are asked whether their use of the equipment on that day will be particularly heavy or intense. If the user indicates in the positive, the Equipment Pre-Start requires additional checks to be completed. For example, in a Vehicle Pre-Start, users are required to complete additional checks for long distance or off-road driving.

Database Tapping

Safe completion of works may require access to third party databases such as Dial Before You Dig (DBYD)s, Contaminated Sites etc. Plans are generally sourced by office personnel and provided in paper format to field personnel. The described systems and methods:

1. Enables field personnel to view pdf files of Plans applicable to their works (through either the Plans icon or through the JSA cover screen). These pdf files are generally sourced and loaded to the application by office personnel;
2. Also contemplated is sourcing Plans directly from third party databases (for example, DBYD and Contaminated Sites databases).

Real Time Automatic Alerts

Auto Alerts (audible and vibratory) can be provided to field personnel during their field activities (which are GPS tracked through their personal mobile device and/or wearable technology):

a. When excavations approach the vicinity of underground services prescribed in DBYDs;
b. When activities approach the vicinity or boundaries prescribed in specific Permits and Plans (for example, Environmental Permits);
c. When personnel enter the vicinity of specific operating plant or equipment (such as excavators) (in this case, an alarm is issued to both the operator and the relevant ground personnel);
d. When specific noise levels are detected by the device;
e. When specific vibration levels are detected by the mobile device;
f. When specific ambient temperatures are detected by the mobile device.

Figure 3:
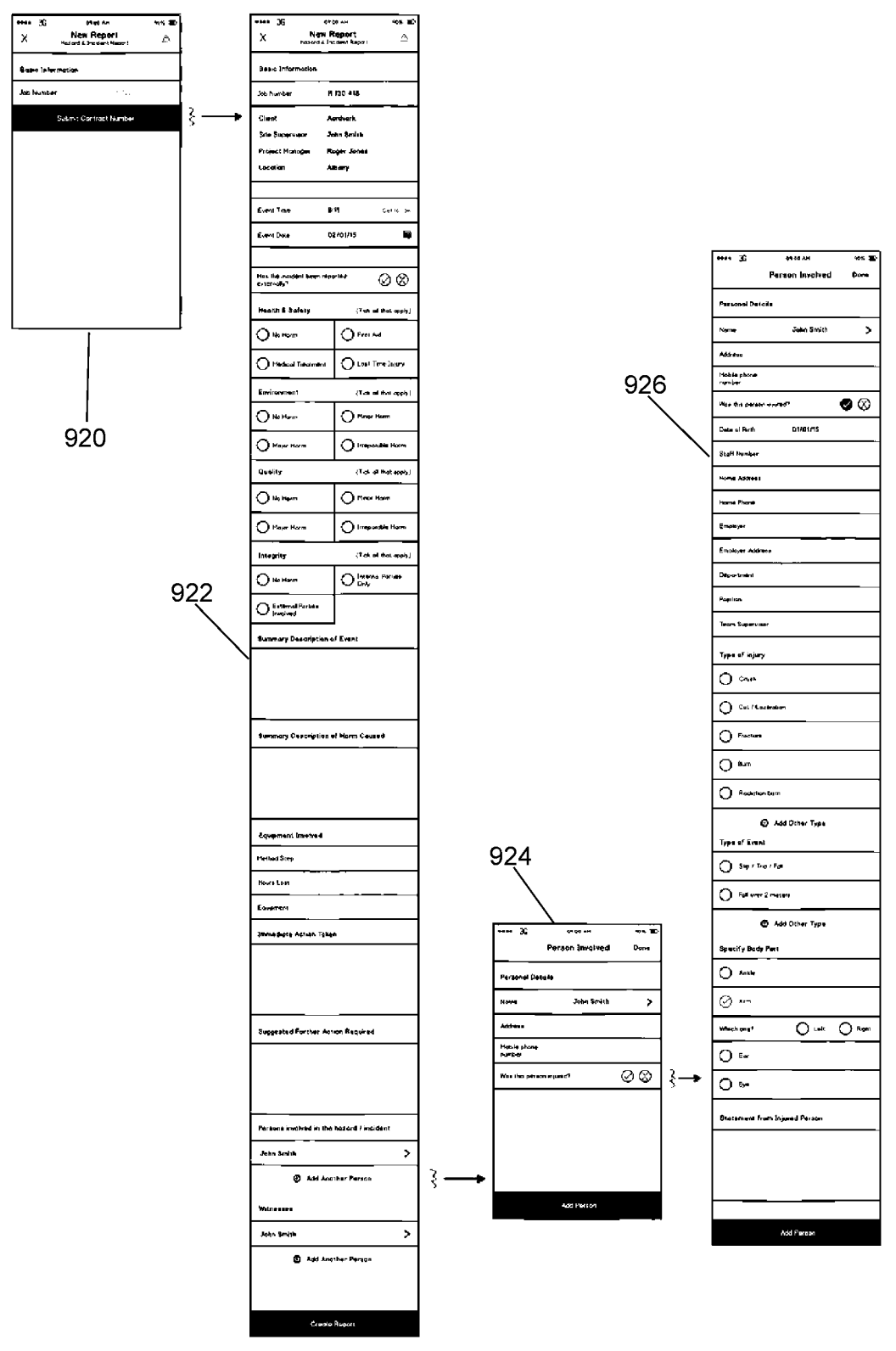

Referring to FIG. 3 the creation of a new report is shown which may be automatically generated such as in the case of reporting failure of an item of equipment, or it may be created because of the observance of something that presents a risk or is an incident that requires reporting, as indicated by item 922. The completion of the report comprises completion of information by selecting checkboxes, for example whether it is a problem involving electricity, whether this is a health and safety risk, whether this is an environmental risk, as well as other factors, such as whether there are any injuries and whether there are other persons involved. This can be entered in boxes 924. In the event that there was an injury involving a person, details can be entered in 926.

Figure 13:
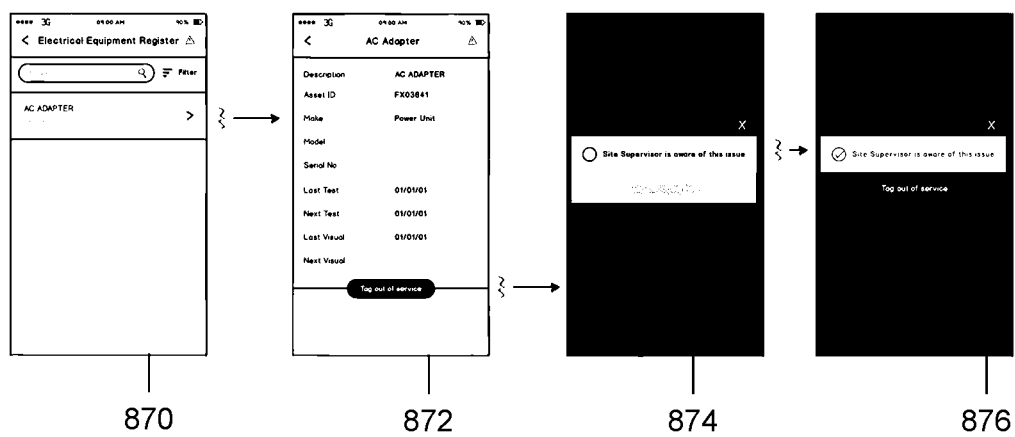

The information can be entered to report such as shown in FIG. 13 and the nature of the item can be selected at 820. At 870 the summary of the severity of the equipment failure is included in the information is provided in boxes 834 and 836. A photograph of the problem can be taken and uploaded.

Figure 2:
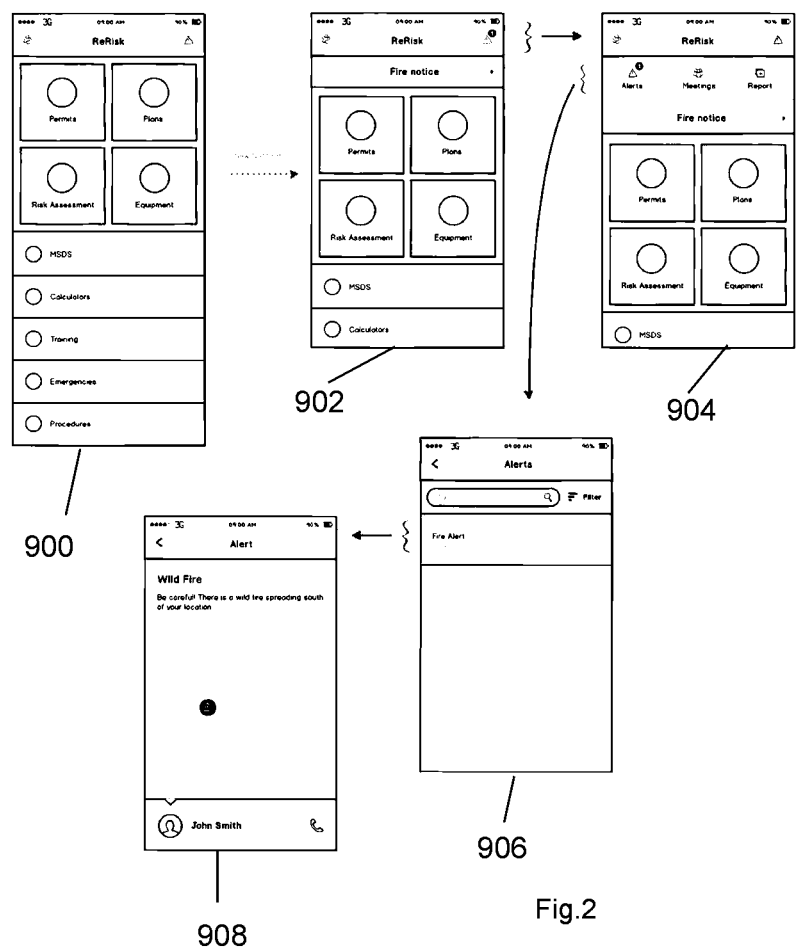

In addition to prompt users about risks, the present invention is able to provide a platform for publication including providing alerts information about meetings of reports shown in FIG. 2. FIG. 53 shows a location menu 932 is opened by selection of the application icon at the top right corner. This shows that there are alerts waiting and that when selected menu opens showing the alert in relation to a particular job, as indicated by job list 934. In FIG. 54 it shows that there is a cyclone update issued 940. The user can select the cyclone update to access additional information 944 about the cyclone alert in FIG. 55.

Information is also able to be provided on the home screen as indicated in more detail in FIG. 56. This shows a list 964 of information such as documents videos and tools under the headings chemicals which provide access to MSDS; a calculator which is available to users to perform compilations in order to perform the job; access to training information such as emergency procedures, and protocols as well as more general procedures. Also under the job tab 960 is a list of documents created (permits, JSAs, Take 5s etc) in relation to the job, as well as reminders of documents that need to be accepted and or signed.

FIG. 2 shows a wild fire alert. A notification box appears under the main title. When selected the alerts menu drops down listing an alert in 904. The alerts window is open in 906 and then the listing of the fire alert appears. This can be opened in 908 to see the wild fire alert and obtain information about it.

Equipment Tagging Auto Reminders

The disclosed systems and methods can include auto reminders for all equipment tagging requirements. For example, auto reminders are issued for the quarterly tagging and checking of electrical equipment, lifting gear, portable ladders, harnesses and recovery gear.

Paint Colour Substitution

When field operators are electronically locating underground services in the field, there is a set of 'common practice' colours that are used to mark the surface with high visibility paint marks. For example, it is common practice to mark the surface with:

A) Blue lines for water;
B) Green or black lines for sewer;
C) Orange lines for power;
D) Yellow lines for gas etc.

In practice however, crews often run out of the required coloured paint and they 'improvise' with other available colours.

The disclosed Excavation Permit enables the user to prescribe the colour they have used to mark each type of underground service by selecting a coloured dot for each service. This is different to paper-based systems which generally dictate the colour for each service (which field operators ignore if paint colours are not available).

Meetings

The application also allows actors to complete meetings including:
a. Adding topics for discussion at the meeting;
b. Using voice to text to record meeting minutes;
c. Allocating Action Items to specific personnel and setting deadlines for each Action Item;
d. Personnel that attended the meeting then receive two notices:
 i. A reminder to review & sign the meeting minutes;
 ii. A reminder for each Action Item allocated to them.

When there are pending risk alerts the site supervisor and or the project manager may be prompted to raise these at the meeting.

Signing

Every time a user 'signs' a document, they must first positively confirm one or more statements (eg; "I have reviewed, understand and agree to comply with this JSA"). The statements are specific to each document and specific to each user's role under each document. If they have a signing outstanding, the need to do so will remain in the reminder until it is attended to.

The disclosed methods and systems for providing and receiving information for risk management in the field, and more particularly, methods and systems for accessing permit, plan, risk assessments and equipment information, auto-populating documents, and for transmitting data and receiving notifications based upon permit availability and location provide tools to engage field operators in the process of risk management and encourage field operator to complete the risk management tasks in an appropriate manner. The disclosed structures and navigation systems and methods include processes for navigation, auto-populating, alerts for permit and plans status, equipment pre-start visual prompts, database tapping, real time auto alerts, equipment heavy usage checks, equipment tagging auto reminders and paint colour substitution, furthermore provide tools to engage field operators in the process of risk management and encourage field operators to complete the risk management tasks in an appropriate manner.

From their personal mobile device:
a. Personnel can see:
 i. All of the Plans etc. attached to the Job Library (via the desktop application),
 ii. All of the documents they have created or signed onto;
b. Site Supervisors and Project Managers can see all of the above—as well as all of the documents created or issued by anyone else on the Job.

General Operational

The tools of the invention may be provided as three applications. These applications are a desktop backend, a desktop frontend, and a mobile application. Each of these applications have different operational functions and access different sets of information found in the organisation database 1212 and the job database 1214 that form the job library 1210.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilise the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A computer implemented method of completion of a risk related document by each of one or more users when performing a job in a field, I)
 wherein the job is one of a number of possible jobs that each user of the one or more users may be assigned to perform in the field, wherein each of the possible jobs entails a plurality of different tasks to be completed by at least one of the one or more users in order for each of the possible jobs to be completed, wherein each of the possible jobs is specific to a worksite in the field, wherein each of the one or more users is assigned to one or more of the possible jobs, wherein an assignment of each of the one or more users to a respective one or more of the possible jobs is stored in a database in a storage device of a server, and
 II) wherein one or more possible roles are available to be performed in relation to each job, wherein each of the one or more users is initially unassigned to any of the one or more possible roles, wherein each of the one or more users may be assigned a role from one of the one or more possible roles, wherein an assignment of the role to a respective one of the possible jobs that a user is currently assigned to is stored in the database as the role of the user, wherein the role may be changed in relation to an assigned job for each of the one or more users,
 III) wherein at least one of the one or more users has a defined authority in relation to a respective role for a respective job, wherein the defined authority of the at least one of the one or more users in relation to the respective role may change, wherein the at least one of the one or more users is assigned the defined authority in relation to the respective role for the respective job, and wherein an assignment of the defined authority to the at least one of the one or more users in relation to the respective role is stored in the database, the method comprising:
 a) identifying one of the one or more users as an identified user of a portable personal computing device;
 b) requesting a list of the number of possible jobs associated with the identified user be provided to the portable personal computing device by the server, wherein the list of the number of possible jobs associated with the identified user is retrieved from the database in the storage device;
 c) receiving, by the portable personal computing device, the list of the number of possible jobs associated with the identified user from the server;
 d) displaying on a screen of the portable personal computing device, the list of the number of possible jobs;
 e) receiving, via an input device of the portable personal computing device, a selection of one of the list of the number of possible jobs associated with the identified user as a selected job to be performed by the identified user;
 f) requesting a list of the one or more possible roles to be performed in relation to the selected job be provided to the portable personal computing device by the server, wherein the list of the one or more possible roles is retrieved from the database in the storage device;

g) receiving, by the portable personal computing device, the list of the one or more possible roles to be performed in relation to the selected job from the server;

h) displaying on the screen, the list of the one or more possible roles to be performed;

i) receiving, via the input device, a selection of one of the list of the one or more possible roles as a current role of the identified user in relation to the selected job;

j) sending a request for information to the server based on the selected job, and generating the information, by the server, according to the current role of the identified user in relation to the selected job as stored in the database and a current authority that the identified user has in relation to the selected job and the current role, as stored in the database, said generated information being suitable for generating a risk related dynamic document;

k) downloading, from the server, the generated information related to the selected job to the portable personal computing device;

l) selecting a type of risk related dynamic document from predetermined types of risk related dynamic document;

m) generating, from the generated information, the risk related dynamic document based on the selected type of risk related dynamic document, wherein generating the risk related dynamic document further comprises automatically populating at least a portion of the risk related dynamic document with at least a portion of the generated information;

n) displaying, for selection on the screen of the portable personal computing device, one or more indicia corresponding to the generated information to complete the risk related dynamic document, wherein completion of the risk related dynamic document is required for the identified user to commence or to complete work required of the current role of the identified user in relation to the selected job;

o) receiving a selection of one of the one or more indicia by receiving an input to the input device of the portable personal computing device;

p) displaying, on the screen of the portable personal computing device, at least one portion of the generated information according to the selection of the one of the one or more indicia;

q) receiving a further input to the portable personal computing device for the at least one portion of the generated information so as to complete the risk related dynamic document;

r) uploading the further input to the server for storage by the server.

2. The method of claim 1, wherein (e) comprises receiving, via the input device of the portable personal computing device, a selection of a job type, wherein the selection of the job type preselects information to be downloaded according to the job type from a library of information available in the database.

3. The method of claim 1, wherein the generated information comprises one or more checks that are able to be performed by the portable personal computing device so as to indicate to the identified user whether or not the identified user is permitted to perform the selected job according to the input received in respect to the generated information displayed; the method further comprising checking whether the identified user is permitted to perform the selected job according to the generated information and the further input; and indicating to the identified user whether or not the identified user is permitted to perform the selected job.

4. The method of claim 1, further comprising:
testing a validity period of one or more of a permit to work of the identified user,
creating a first alert if a current time is not within the validity period,
testing an applicability of a valid locality of the permit, and
creating a second alert if a current location is not within the valid locality when an action is commenced requiring a respective permit.

5. The method of claim 1, further comprising checking requirements for issuance of a permit to the identified user against records of the identified user to which the permit is intended to be issued, and, in an event that the requirements are not met, raising an alert that the requirements are not met.

6. The method of claim 1, wherein the risk related dynamic document to be completed is a Job Safety Assessment (JSA), the method further comprising:
receiving a selection of method steps in an activity for which the JSA is being created;
receiving a selection of risks applicable to the steps;
receiving a selection of controls to mitigate the risks;
receiving a selection of a risk rating for each of the risks;
receiving a selection of one or more personnel to which the JSA is applicable, wherein the steps may be selected from a predefined list of steps, the risks may be selected from a predefined list of risks, the controls may be selected from a predefined list of controls, each risk rating may be selected from a predefined risk rating matrix, and/or the one or more personnel are selected from a predefined list of personnel assigned to the selected job for which the JSA is being created, wherein each of the one or more personnel are sent a message to request acceptance of the JSA.

7. The method of claim 1, wherein the method further comprises receiving a selection of a task to be performed by the identified user; receiving a selection of at least one possible risk that may be applicable to the task; and
receiving a selection of controls to mitigate the at least one possible risk.

8. The method of claim 7, wherein a first task is selected from a predefined list of tasks and a second task is entered by the identified user, wherein the at least one possible risk is selected from a predefined list of possible risks or entered by the identified user, and wherein the controls are selected from a predefined list of controls or the controls are entered by the identified user, and when the identified user enters the second task, the at least one possible risk or a control, the second task, the at least one possible risk, or the control is respectively added to the predefined lists of tasks, the predefined list of possible risks or the predefined list of controls.

9. The method of claim 7, further comprising displaying information about at least one check to be performed before use of an item of equipment required for the selected job; displaying a check box for each part of the item of equipment to be checked; receiving a check input to the portable personal computing device of a check selection when the part is checked; and displaying a message that the item of equipment is unable to be used until the at least one check is successfully completed, wherein, if the at least one check is selected as a failure of a pre-start check, creating an alert, wherein the item of equipment is flagged in the database as out of service until it is repaired or replaced.

10. The method of claim 1, comprising determining a response according to the further input, wherein the response determines what the identified user of the portable personal computing device is permitted to do in respect of the selected job and what at least a second of the one or more users are permitted to do in respect of the selected job, wherein the response is transmitted to one or more portable personal computing devices according to the current role of the identified user in relation to the selected job.

11. The method of claim 1, wherein the current authority in relation to the current role of the identified user for the selected job is allocated from a hierarchy of authorities available up to a defined authority of the identified user, for an enterprise for which the identified user is able to complete the work, by a supervisory user of the enterprise having authority to make such a change, wherein the method further comprises:
determining when the identified user requires a permit to perform the selected job and when the portable personal computing device is at a location at which the selected job is to be performed by:
 i) tracking, via GPS, a location of the portable personal computing device;
 ii) creating a geofence for a location at which the selected job is to be performed;
 iii) tracking whether the location of the portable personal computing device is within the geofence;
 iv) tracking whether the permit to perform the selected job has expired;
 v) determining when the location of the portable personal computing device is within the geofence and when the permit to perform the selected job has expired, and if so determined, generating a notification.

12. The method of claim 1, further comprising:
 i) receiving a list of document templates associated with a task at the portable personal computing device from the server;
 ii) displaying the list of document templates on the screen of the portable personal computing device in a manner that allows for selection of one of the list of document templates;
 iii) receiving, from the identified user, a selected one of the list of document templates, via the input device;
 iv) sending, to the server, the selected one of the list of document templates;
 v) receiving, by the server, the selected one of the list of document templates from the portable personal computer device;
 vi) retrieving, by the server, a document template from the storage device according to the selected one of the list of document templates;
 vii) sending the document template to the portable personal computer device; and
 viii) receiving from the server the document template;
wherein the document template comprises a preselected at least one label of at least one field in the risk related dynamic document to be completed by the identified user entering document completion information into the risk related dynamic document and wherein the document template limits the completion information able to be entered by the identified user according to the selected job, the current role, and the current authority.

* * * * *